US010514217B2

(12) United States Patent
Wall et al.

(10) Patent No.: US 10,514,217 B2
(45) Date of Patent: Dec. 24, 2019

(54) TUBE CLEANING AND INSPECTING SYSTEM AND METHOD

(71) Applicant: Arizona Board of Regents on Behalf of the University of Arizona, Tucson, AZ (US)

(72) Inventors: Alan Wall, Tucson, AZ (US); Daniel Craeg McCrady, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 20 days.

(21) Appl. No.: 15/494,259

(22) Filed: Apr. 21, 2017

(65) Prior Publication Data

US 2017/0307312 A1  Oct. 26, 2017

Related U.S. Application Data

(60) Provisional application No. 62/326,572, filed on Apr. 22, 2016.

(51) Int. Cl.
| F28G 15/00 | (2006.01) |
| B08B 9/045 | (2006.01) |
| F28G 15/02 | (2006.01) |
| G01S 17/42 | (2006.01) |
| B08B 9/04 | (2006.01) |
| G01S 17/02 | (2006.01) |
| G01S 17/88 | (2006.01) |
| G01S 17/89 | (2006.01) |
| F28G 1/08 | (2006.01) |
| F28G 1/16 | (2006.01) |
| B08B 9/043 | (2006.01) |

(52) U.S. Cl.
CPC .............. F28G 15/003 (2013.01); B08B 9/04 (2013.01); F28G 1/08 (2013.01); F28G 1/163 (2013.01); F28G 15/02 (2013.01); G01S 17/026 (2013.01); G01S 17/42 (2013.01); G01S 17/88 (2013.01); G01S 17/89 (2013.01); B08B 9/043 (2013.01); B08B 9/0436 (2013.01)

(58) Field of Classification Search
CPC ......... B08B 9/04; B08B 9/043; B08B 9/0436; G01S 17/026; G01S 17/88; G01S 17/42; G01S 17/89; F28G 1/163; F28G 15/02; F28G 1/08
See application file for complete search history.

(56) References Cited

U.S. PATENT DOCUMENTS 3,794,051 A * 2/1974 Lee, Jr. ................. B08B 9/0323
134/167 C
3,901,252 A * 8/1975 Riebe .................... B08B 9/0323
134/167 C (Continued)

Primary Examiner — Benjamin L Osterhout
(74) Attorney, Agent, or Firm — Lathrop Gage LLP

(57) ABSTRACT

Systems and methods may utilize a two-axis stand configured with a locator moveable along two orthogonally oriented axes. The locator may scan a tube opening. A controller may position the locator and the two-axis stand to a) scan across a plurality of tube openings, b) locate the plurality of tube openings based on the scan, and c) activate a cleaning tool to clean tube interiors associated with respective tube openings. Control may be automated and/or based on user interaction with a user interface.

18 Claims, 18 Drawing Sheets

(56) References Cited

U.S. PATENT DOCUMENTS

| | | | | |
|---|---|---|---|---|
| 3,903,912 | A * | 9/1975 | Ice, Jr. | B08B 9/0323 |
| | | | | 134/167 C |
| 4,527,515 | A * | 7/1985 | Hester, II | F22B 37/483 |
| | | | | 122/382 |
| 4,773,357 | A * | 9/1988 | Scharton | F22B 37/483 |
| | | | | 122/382 |
| 5,570,660 | A * | 11/1996 | Vandenberg | F22B 37/483 |
| | | | | 122/379 |
| 6,681,839 | B1 * | 1/2004 | Balzer | F28G 1/163 |
| | | | | 122/379 |
| 8,646,416 | B2 * | 2/2014 | Hawkins | F22B 37/003 |
| | | | | 122/379 |
| 2004/0069331 | A1 * | 4/2004 | Garman | B08B 9/0433 |
| | | | | 134/167 C |
| 2009/0255557 | A1 * | 10/2009 | Gardner | B08B 9/04 |
| | | | | 134/18 |
| 2012/0024321 | A1 * | 2/2012 | Hays | B08B 3/02 |
| | | | | 134/10 |
| 2012/0067370 | A1 * | 3/2012 | Crock | B08B 9/043 |
| | | | | 134/6 |
| 2015/0068563 | A1 * | 3/2015 | Gzym | F28G 15/04 |
| | | | | 134/168 C |

* cited by examiner

Motor Configuration

| Max X Speed (steps/sec) | 300 |
| X Acceleration (steps/sec^2) | 6000 |
| X (steps/mm) | 15.7 |
| Max Y Speed (steps/sec) | 800 |
| Y Acceleration (steps/sec^2) | 8000 |
| Y (steps/mm) | 15 |

*FIG. 20*

TUBE CLEANING AND INSPECTING SYSTEM AND METHOD

CROSS REFERENCE TO RELATED APPLICATIONS

This application claims priority to, and benefits from, U.S. Provisional Patent No. 62/326,572, filed Apr. 22, 2016 and which is incorporated by reference in its entirety herein.

BACKGROUND

Tubular heat exchangers are machines that add heat to, or remove heat from, a fluid. One example is a chiller that is often used in a large air conditioning system of a building. Chillers, such as condenser barrels used in coolers, commonly include a heat exchanger having a bundle of many tubes. A fluid, such as water for example, flows through the tubes to remove heat from a refrigerant vapor outside the tubes, causing the refrigerant to condense on the tubes. Over time, the tubes develop buildup of sediment and minerals from the fluid, which reduces the cooling efficiency of the chiller. The scale build-up that occurs within the tubes has the potential of reducing the chiller efficiency by up to 30%, which can have a negative impact on the cost of operating a large chilled water facility. The tubes are usually cleaned individually by an operator using a handheld device. Due to the large number of tubes per heat exchanger, the cleaning process is time consuming and costly.

BRIEF DESCRIPTION OF THE FIGURES

FIG. 20 shows the motor configuration menu displayed on user interface of FIG. 1, in embodiments.

DETAILED DESCRIPTION OF THE EMBODIMENTS

Figure 1:
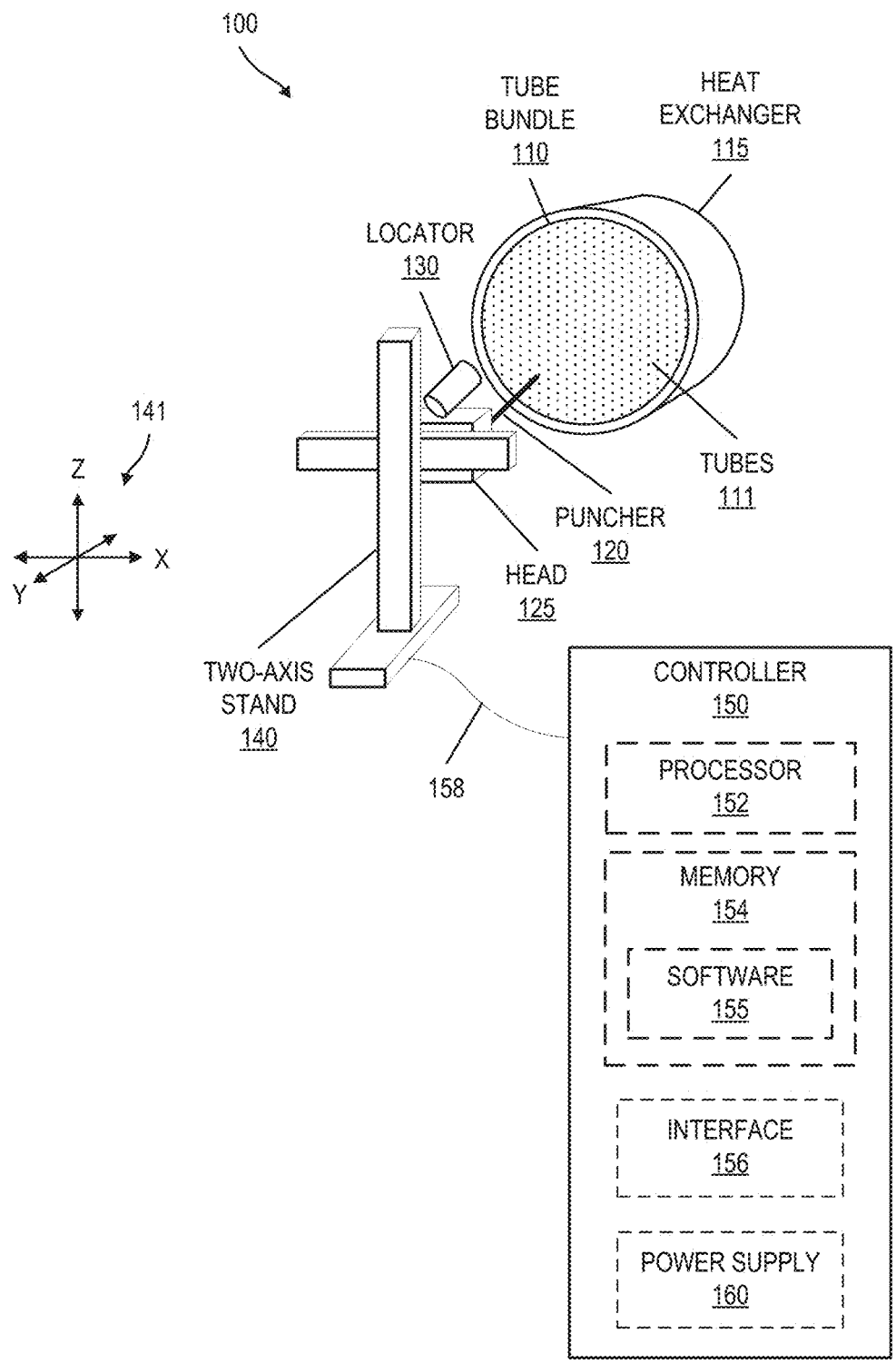
FIG. 1 schematically illustrates a tube cleaning and inspecting system, in an embodiment.

FIG. 1 schematically illustrates an exemplary tube cleaning and inspecting system 100. System 100 provides automated means of scanning, cleaning, and inspecting tubes 111 of a tube bundle 110 inside a heat exchanger 115. Tube bundle includes a plurality of tubes 111, which are not all labeled in FIG. 1 for clarity of illustration. Tubes 111 may be part of a chiller device. Tubes 111 may be cleaned with a cleaning apparatus such as a puncher 120. Puncher 120 includes for example a cleaning tool at its free end configured for cleaning an interior of tubes 111, as described below. In embodiments, puncher 120 is a Goodway Ream-A-Matic that is modified including one or more of the components herewith. This modification may be an external add-on to the Goodway system. In an embodiment, a hose supplying water is coupled to puncher 120 for spraying the interior and an exposed facial exterior of tubes 111.

Figure 9:
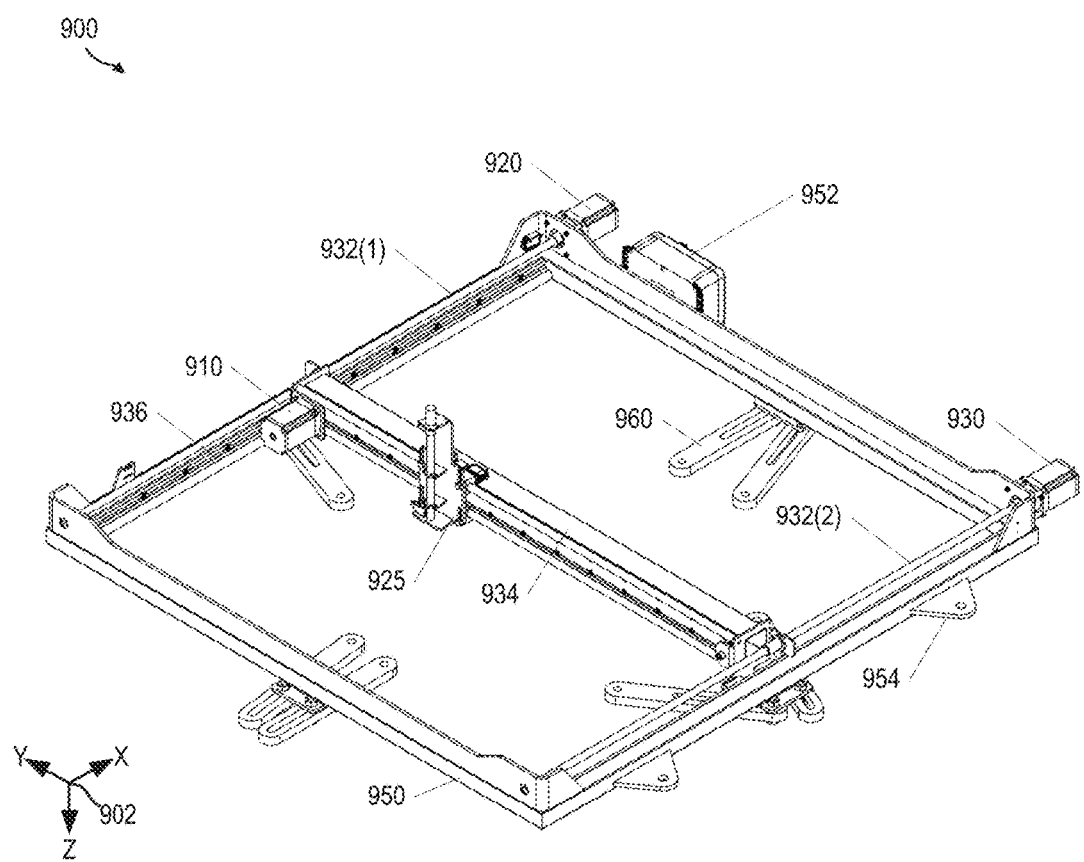
FIG. 9 is a schematic drawing showing a two-axis stand of a tube cleaning and inspecting system, in an embodiment.

A head 125 may be mounted to a two-axis stand 140, for positioning puncher 120 for activating the cleaning tool and inserting and retracting the cleaning tool into and out of tubes 111. Two-axis stand 140 includes means to provide linear motion, such as a stepper motor for example, along each of an X-axis and a Z-axis that form two orthogonally oriented axes of X, Y, Z reference axes 141, FIG. 1. An exemplary two-axis stand 900, FIG. 9 is an example of two-axis stand 140. Stand 140 may be included on a wheeled cart for increasing mobility of the stand 140. As such, the stand 140 may be mounted to a frame of a chiller and potentially turn tube cleaning task into a single-person job. A limit switch may be used along each axis to prevent motion beyond a predetermined limit. The head provides means, such as a gimbal for example, to rotate puncher 120 for aligning with individual tubes 111.

A locator 130 may also be mounted to head 125. In an embodiment, locator 130 and puncher 120 are mounted to head 125 with a known offset distance therebetween. In embodiments, locator 130 may be positioned above the puncher 120 to prevent water from the puncher 120 from spilling onto locator 130. Moreover, in embodiments, locator 130 may include a shield (not shown) for preventing water from accumulating on the face of the locator 130. Locator 130 is for example a laser sensor, which includes a laser adjustably aligned via head 125 for illuminating tube bundle 110 with collimated laser light, and an optical sensor adjustably aligned via head 125 to detect laser light reflected off of tube bundle 110. Alternatively, the laser may be replaced with another light source, such as one or more light-emitting diodes (LEDs) for example, without departing from the scope hereof. The optical sensor is a light sensitive device, such as a photodiode for converting light into electrical current or a photoresistor whose resistance decreases with increasing light intensity, for example. By scanning the facial openings of tubes 111 of tube bundle 110, locator 130 is used to locate and determine a size of each of tubes 111. For example, locator 130 is capable of determining an edge of a hole such as a hole of one of tubes 111 (using the method shown in FIG. 6 for example).

A controller 150 is used to control head 125, puncher 120, locator 130, and two-axis stand 140, as described below. In an embodiment, controller 150 includes a processor 152, a memory 154, and a software 155 coupled to head 125, puncher 120, locator 130, and two-axis stand 140 via a two-way communication path 158, which may include one or both of a wired and/or a wireless communication media. Memory 154 in some embodiments is a memory system that includes both transitory memory such as RAM and non-transitory memory such as, ROM, EEPROM, Flash-EEPROM, magnetic media including disk drives, and optical media. Memory 154 stores software 155 as machine readable instructions executable by processor 152 to control puncher 120, locator 130 and two-axis stand 140. Controller 150 may include an interface 156 to enable a user to provide input and receive data. For example, a user interacting with interface 156 may input information about the system 100, such as number of tubes, bundle length, brush diameter, user identification, location, system identification, and other information which is then stored within memory 154. A power supply 160 may be incorporated into controller 150 or optionally provided separately for providing electrical power, for example direct current (DC) electrical power, to components of system 100.

Control over two-axis stand 140 is provided by controller 150 to position head 125 for scanning tubes 111 with locator 130. Controlling position of head 125 may be provided via a program of software 155 stored in memory 154, which may be manipulated by a user via interface 156. A feedback device, such as a Hall-effect sensor, may be mechanically coupled to head 125 for detecting a position of the cleaning tool via a magnet. In this manner, the Hall-effect sensor is used to determine position of the cleaning tool relative to the facial opening of tubes 111 when for example the cleaning tool of puncher 120 is retracted from one of tubes 111. In the event that puncher 120 does not successfully insert into one of tubes 111, either due to misalignment or an obstruction, controller 150 may command head 125 to stop or retract.

A shape of cleaning tool and puncher 120 is not necessarily limited to be compatible with a circular cross-sectional shape. Puncher 120 and its cleaning tool may be shaped appropriately to accommodate tubes 111 having alternative cross-sectional shapes, including rectangular, square, triangular, hexagonal, octagonal, etc. without departing from the scope hereof. Tubes 111 may include bell and marine barrel configurations, in embodiments.

Figure 6:
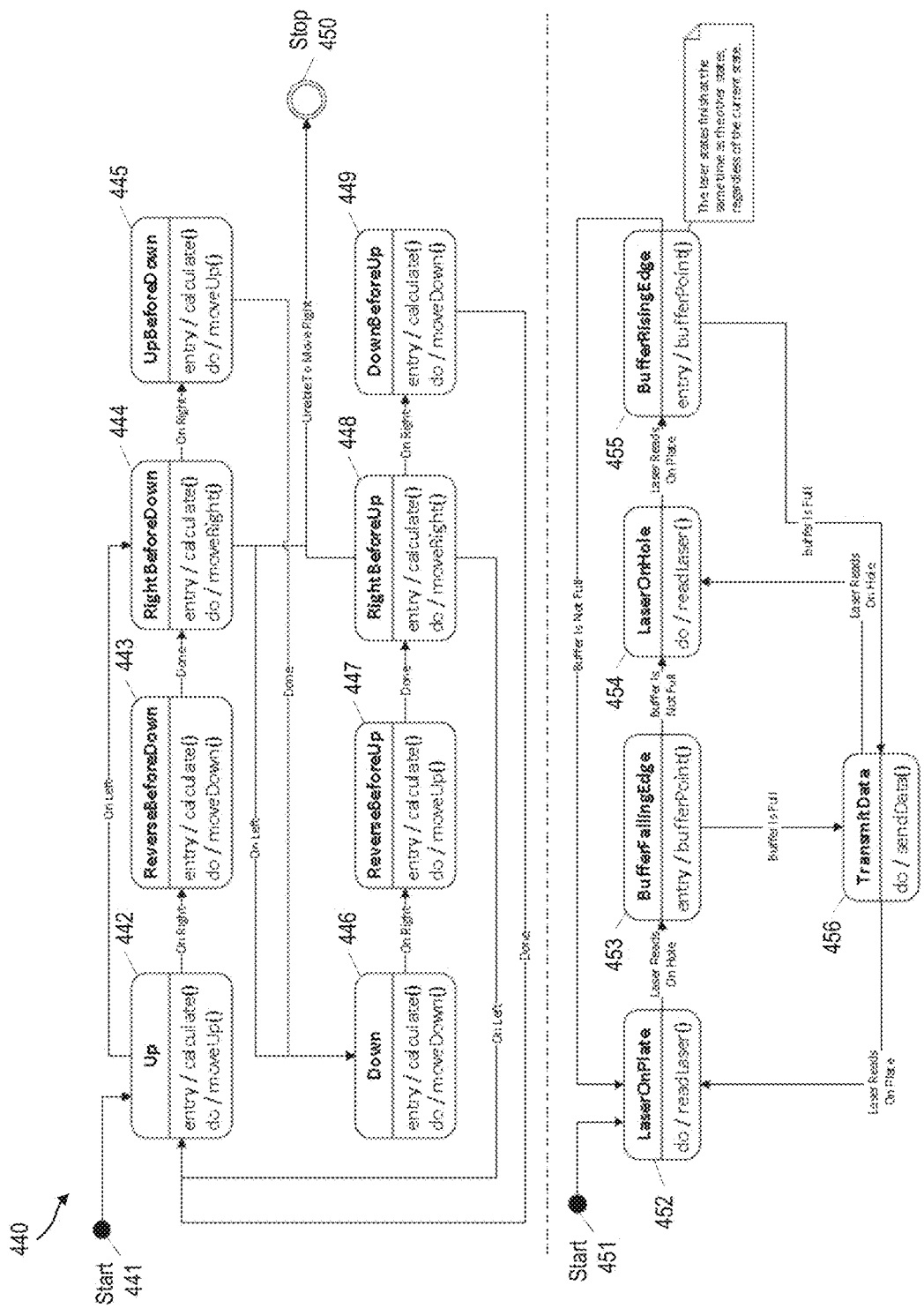
FIG. 6 is a flow diagram showing steps of a method for scanning with the tube cleaning and inspecting system of FIG. 1.
Figure 7:
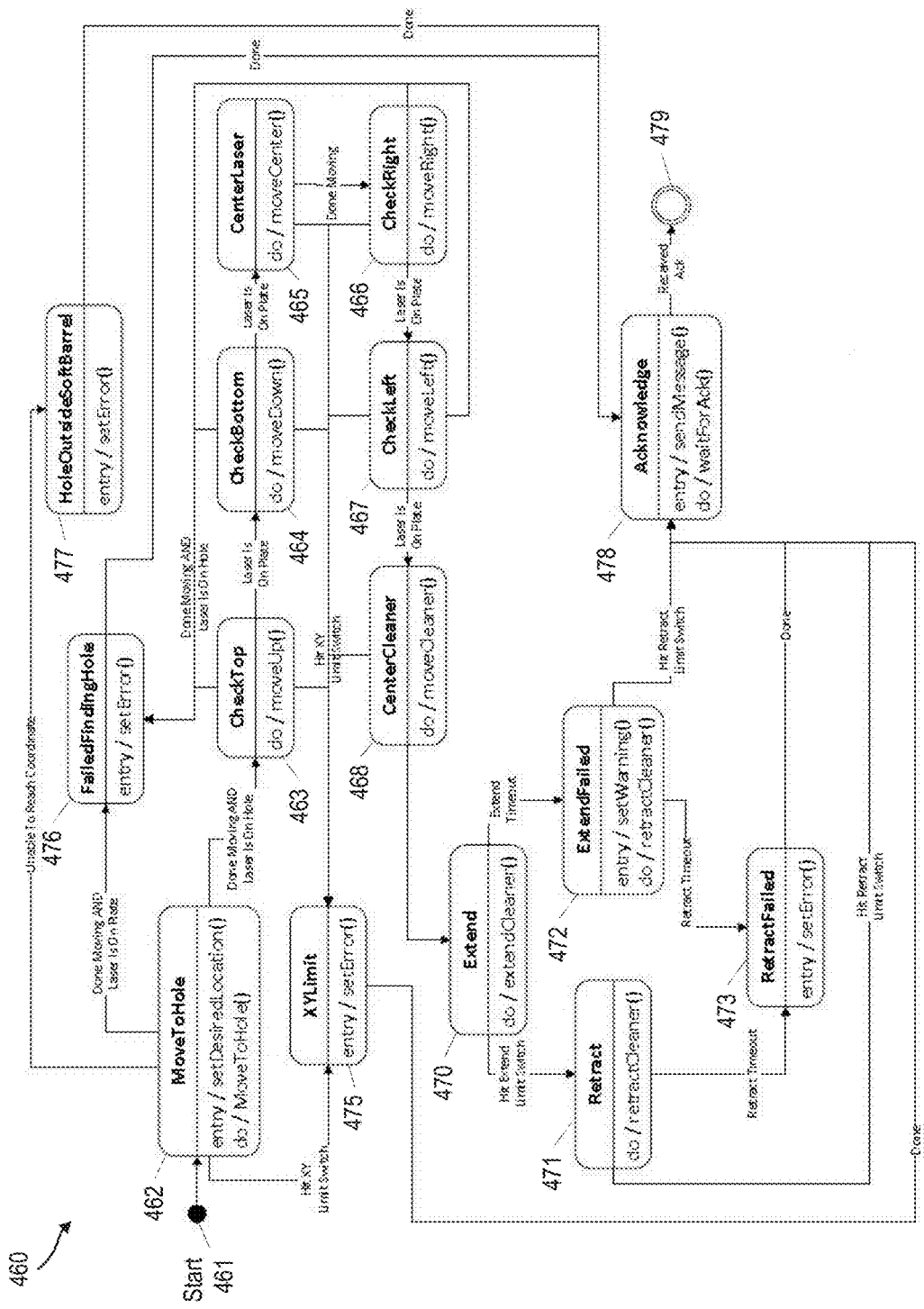
FIG. 7 is a flow diagram showing steps of a method for cleaning with the tube cleaning and inspecting system of FIG. 1.

Control of puncher 120 is provided by controller 150 to clean tubes 111 by moving the cleaning tool and/or by spraying cleaning solution (as shown in FIG. 7 for example). Control of locator 130 is provided by controller 150 to capture data for producing a map of a size and a location of tubes 111, for example. The data captured by locator 130 may be stored in memory 154 of controller 150. A user may validate or edit the map via interface 156. The map may be produced by scanning each one of tubes 111 individually (as shown in FIG. 6 for example). Alternatively, the map may be reconstructed from one scan encompassing the entire tube bundle 110 using a scan pattern such as a raster pattern, a grid pattern, a spiral pattern, or called from memory from a prior scan etc. The map may further rely on saved data from previous scans to allow the scan to occur more quickly because the locator 130 may scan based on an expected pattern stored within memory 154. In embodiments, should the map include anomalies (such as a configuration different than expected), the locator 130 may be used to rescan the tubes 111 to verify the pattern thereof.

In an embodiment, controller 150 may perform a test to determine system faults including operational and functional failures. Software 155 may include a fault detection module for determining system faults. Example faults include a cleaning tool of puncher 120 that is stuck within one of tubes 111, a lack of water flow from puncher 120, an obstruction blocking movement of two-axis stand 140, etc.

The cleaning tool of puncher 120 may require replacement after being used to clean a certain number of tubes 111. The cleaning tool may be visually inspected by a user of system 100 or an inspection probe may be used to inspect the cleaning tool, as described below. The cleaning tool is for example a disposable cleaning tool with a quick disconnect or threads for connecting to and removing from puncher 120. The cleaning tool may be replaced by a user of system 100 or automatically by a robotic arm without departing from the scope hereof. In an embodiment, the cleaning tool is a brush that may be rotated to scrub tubes 111.

In an embodiment, the cleaning tool of puncher 120 is interchangeable to enable an installation of an inspection probe. The inspection probe may be a magnetic flux sensor, a laser sensor, or a camera for example, used to inspect the interior surface of tubes 111 to verify cleanliness and structural integrity. Data from the inspection probe may be used to identify a crack in one of tubes 111 and to discern between a clean tube, a dirty tube, and a cracked tube for example. The inspection probe may also be used to inspect the cleaning tool without departing from the scope hereof.

Figure 2:
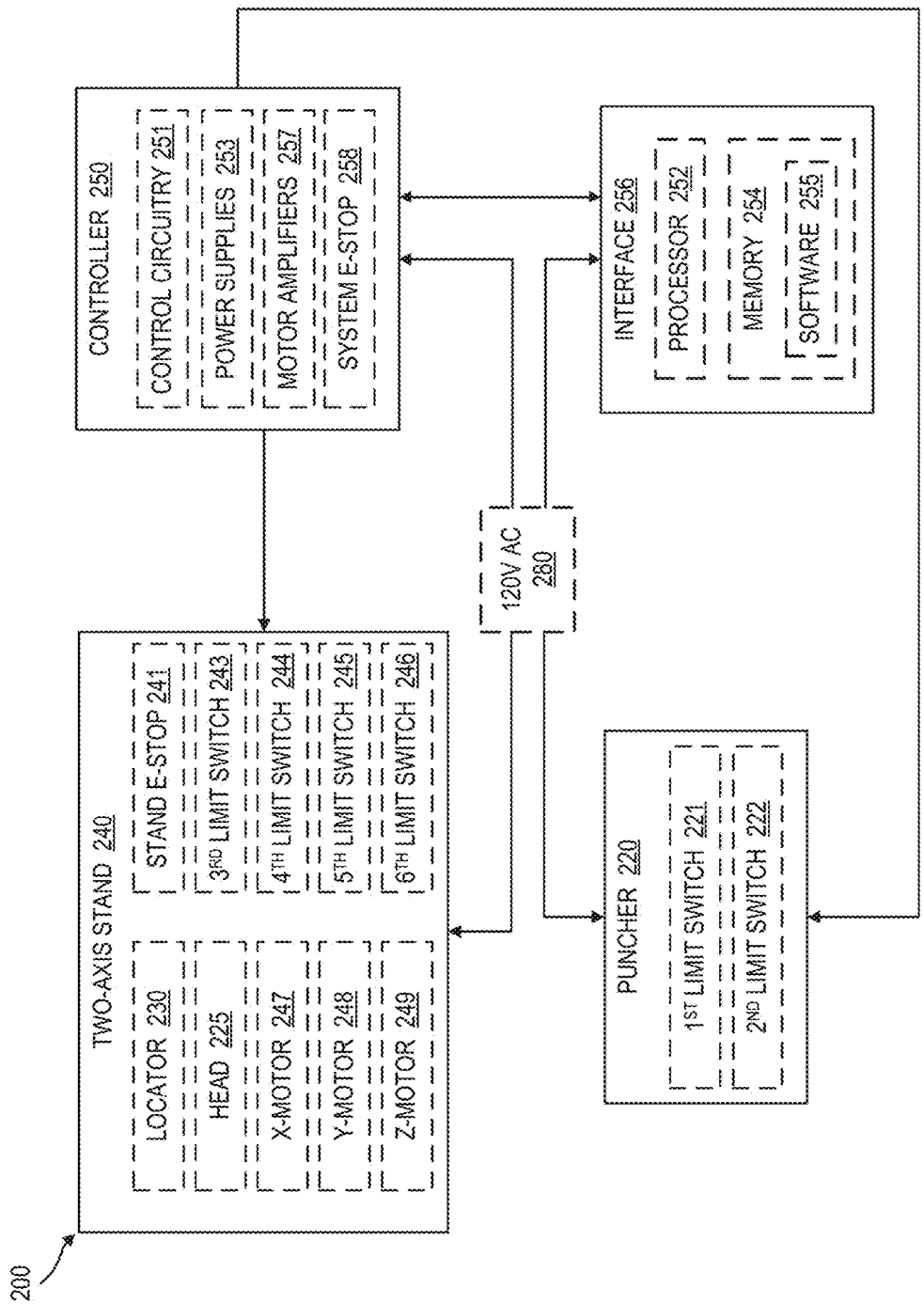
FIG. 2 is a block diagram of electrical circuitry for a tube cleaning and inspecting system, in an embodiment.

FIG. 2 is a block diagram of an exemplary tube cleaning and inspecting system 200, which is an example of system 100, FIG. 1. Specifically, system 200 illustrates electrical connections between components of system 200, including a puncher 220, a two-axis stand 240, a controller 250, and an interface 256, which are examples of puncher 120, two-axis stand 140, controller 150, and interface 156, respectively, of FIG. 1.

Puncher 220 includes a first limit switch 221 and a second limit switch 222, which are for example physical limit switches that prevent travel of the cleaning tool beyond a predetermined limit. For example, first limit switch 221 may stop travel in a first direction along the Y-axis of X, Y, Z, axes 141, FIG. 1, and second limit switch 222 may stop travel in a second direction along the Y-axis, opposite the first direction.

Two-axis stand 240 includes a locator 230, which is an example of locator 130, FIG. 1. Locator 230 is aligned to inspect tube bundle 110. In an embodiment, locator 230 is a laser sensor aligned to illuminate tube bundle 110 and receive reflected laser light for scanning, locating and sizing tubes 111. Locator 230 is mechanically coupled to a head 225, which is an example of head 125, FIG. 1. Head 225 is mechanically coupled to two-axis stand 240. An X-motor 247, a Y-motor 248, and a Z-motor 249 enable movement of head 225. For example, X-motor 247, Y-motor 248, and Z-motor 249 move head 125 along X, Y, Z reference axes 141, FIG. 1. In embodiments, X-motor 247, Y-motor 248, and Z-motor 249 have at least an Ip67 waterproofing rating. Two-axis stand 240 includes one or more limit switches, which are for example physical switches configured to limit motion of head 225 by preventing movement beyond a predetermined location. For example, a third limit switch 243 limits motion along the X-axis in a third direction, and a fourth limit switch 244 limits motion along the X-axis in a fourth direction opposite the first direction. Similarly, a fifth limit switch 245 limits motion along the Z-axis in a fifth direction, and a sixth limit switch 246 limits motion along the Z-axis in a sixth direction, opposite the fifth direction. A stand emergency stop (E-stop) 241 provides a button, which may be illuminated, to enable a user to quickly halt movement of two-axis stand 240 in the event of an emergency.

Controller 250 includes control circuitry 251, which includes one or more of a printed circuit board, a microcontroller, a programmable logic controller (PLC), a programmable automation controller, or an Arduino Mega 2560 controller for example. Power supplies 253 provide DC electrical power to components, such as to X-motor 247, Y-motor 248, and Z-motor 249, which may be amplified by motor amplifiers 257. A system emergency stop (E-stop) 258 enables a user to quickly halt movement of system 200. Controller 250 provides control of two-axis stand 240, including control of locator 230, head 225, and X, Y, and Z-motors 247, 248, 249, respectively.

Interface 256 is an example of interface 156, FIG. 1. Interface 256 may include a processor 252, memory 254, and software 255, which are examples of processor 152, memory 154, and software 155, FIG. 1. Interface 256 enables a user to provide input to, and receive data from, controller 250. In an embodiment, interface 256 includes a LabVIEW user interface.

Electrical power from a standard 120 volt alternating current (AC) wall socket 280 may be provided to puncher 220, two-axis stand 240, controller 250, and interface 256.

Figure 3:
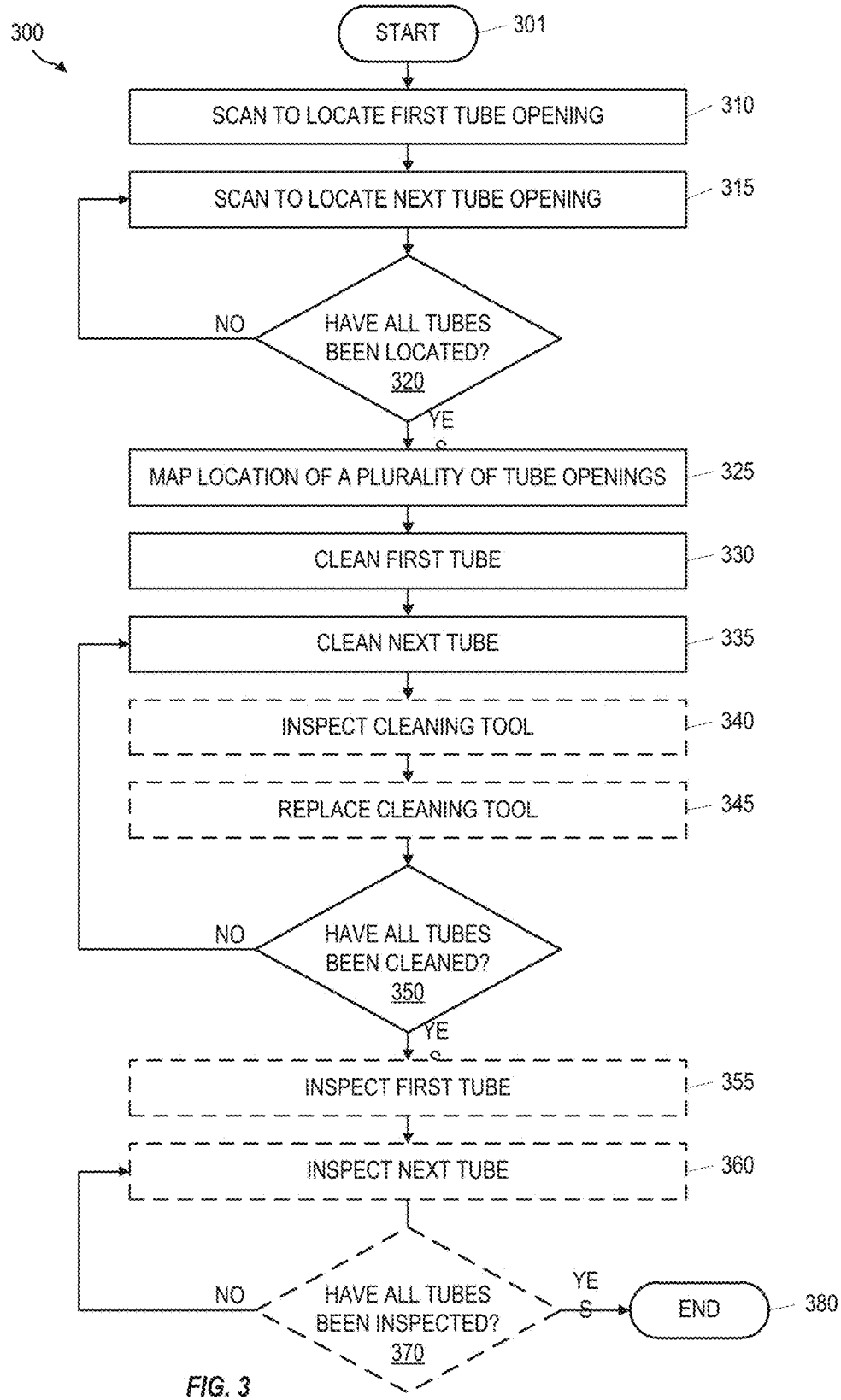
FIG. 3 is a block diagram of a tube cleaning and inspecting method, in an embodiment.

FIG. 3 is a block diagram of an exemplary tube cleaning and inspecting method 300. Method 300 is performed using a tube cleaning and inspecting system, such as system 100, FIG. 1 or system 200, FIG. 2 for example. The order of steps shown in FIG. 3 are exemplary only and may be reordered to perform the function of method 300 without departing from the scope hereof.

In a step 301, method 300 starts. In an example of step 301, method 300 is started by a user via interface 156, FIG. 1.

In a step 310, a tube opening is scanned with a locator. In an example of step 310, a facial end of one of tubes 111 is scanned with locator 130, FIG. 1, which may include a laser sensor that illuminates the facial end of one of tubes 111 and detects reflected laser light. Data for reflected laser light from laser sensor is stored in memory 154 of controller 150 for example. Locator 130 may move along X and Z axes of X, Y, Z axes 141, FIG. 1 via two-axis stand 140 to perform the scan. Controller 150 determines a location of the tube opening via programs of software 155 for example. In an embodiment, locator 130 determines a location and a size of a tube opening.

In a step 315, the locator scans to locate a next tube opening via the two-axis stand. In an example of step 315, locator 130 scans until locating a next tube opening of tube bundle 110 via two-axis stand 140. FIG. 6 illustrates an exemplary scanning routine.

In a step 320, a decision is made. If in step 320, it is determined that all tube openings have been located, method 300 proceeds to step 325. Otherwise, method 300 repeats step 315 to scan and locate the next tube opening.

In step 325, a location of a plurality of tube openings is mapped. In an example of step 325, controller 150 determines the location of a plurality of openings of tubes 111 based on data from locator 130. The locations may then be mapped and displayed via interface 156 for example. A user of system 100 may validate or edit the map of tube opening locations via interface 156. Interface 156, in embodiments, may display mechanically sealed-off tubes that are recognized during step 325, and may include a graphic of the tube pattern, including sealed-off tubes as well as tube characteristics such as diameter. Interface 156 may be configured to present an audible and/or visible alarm when attention by the user is required during operation of system 100, such as during a validation requirement, operation control of system 100 (such as turning on/off brush motor and/or water source), equipment errors (such as a requirement to change the puncher cleaning head/brush), or other errors within system 100, etc.

In step 330, a first tube is cleaned. In an example of step 330, the cleaning tool of puncher 120 is inserted into one of tubes 111 via two-axis stand 140, FIG. 1. Controller 150 moves head 125 along X and Z orthogonally oriented axes of X, Y, Z reference axes 141 for example, using two-axis stand 140. Head 125 may pivot to align the cleaning tool of puncher 120 with one of tubes 111. Once aligned, controller 150 commands puncher 120 to move along the Y-axis to insert the cleaning tool into one of tubes 111. Following insertion of the cleaning tool, the tube may be cleaned by moving the cleaning tool of puncher 120 under command of controller 150. In an embodiment, the cleaning tool is a brush that may spin about its long axis in a continuous or alternating clockwise or counter clockwise direction. The rotational velocity of the cleaning tool may be varied under control of controller 150 without departing from the scope hereof. Command of the cleaning tool of puncher 120 is provided automatically by controller 150 via programs of software 155 or by a user via interface 156 for example. Exemplary software steps for cleaning are shown in FIG. 7. In an embodiment, a hose supplying a cleaning solution is coupled to puncher 120 for spraying tubes 111. Following cleaning, puncher 120 retracts the cleaning tool.

In a step 335, the puncher moves to the next tube opening via two-axis stand for cleaning. In an example of step 335, controller 150 commands head 125 to move to the next tube of tube bundle 110 for cleaning based on the mapping of step 325, and puncher 120 inserts the cleaning tool into the next tube for cleaning. Exemplary cleaning steps are shown in FIG. 7.

In optional step 340, the cleaning tool is inspected. In an example of step 340, the cleaning tool of puncher 120 is inspected. The inspection may be performed visually by a user or via an inspection probe.

In optional step 345, the cleaning tool is replaced. In an example of step 345, the cleaning tool of puncher 120 is replaced. The cleaning tool may be replaced by a user or automatically by a robotic arm for example. Replacement of the cleaning tool may be performed based on the inspection of step 340, or following cleaning of a predetermined number of tubes 111.

In a step 350, a decision is made to determine if all the tubes have been cleaned. If so, method 300 may proceed to optional step 355. Otherwise, method 300 returns to step 335. In an example of step 350, after one hundred tubes 111, FIG. 1 have been cleaned, method 300 proceeds to step 355.

In an optional step 355, a first tube is inspected. In an example of step 355, the first tube of tube bundle 110 is inspected via the inspection probe. The inspection may determine a condition of the tube, such as clean, dirty, or welded shut for example. In an embodiment, the inspection is able to distinguish between a cracked tube and a dirty tube.

In an optional step 360, the next tube is inspected. In an example of step 360, the next tube of tube bundle 110 is inspected based on the mapping of step 325.

In an optional step 370, a decision is made to determine if all tubes have been inspected. If so, method 300 proceeds to step 380 to end. Otherwise, method 300 returns to step 360 to inspect the next tube. In an example of step 370, controller 150 determines that fewer than the total number of tubes 111 have been inspected and method 300 returns to step 360.

Figure 4:
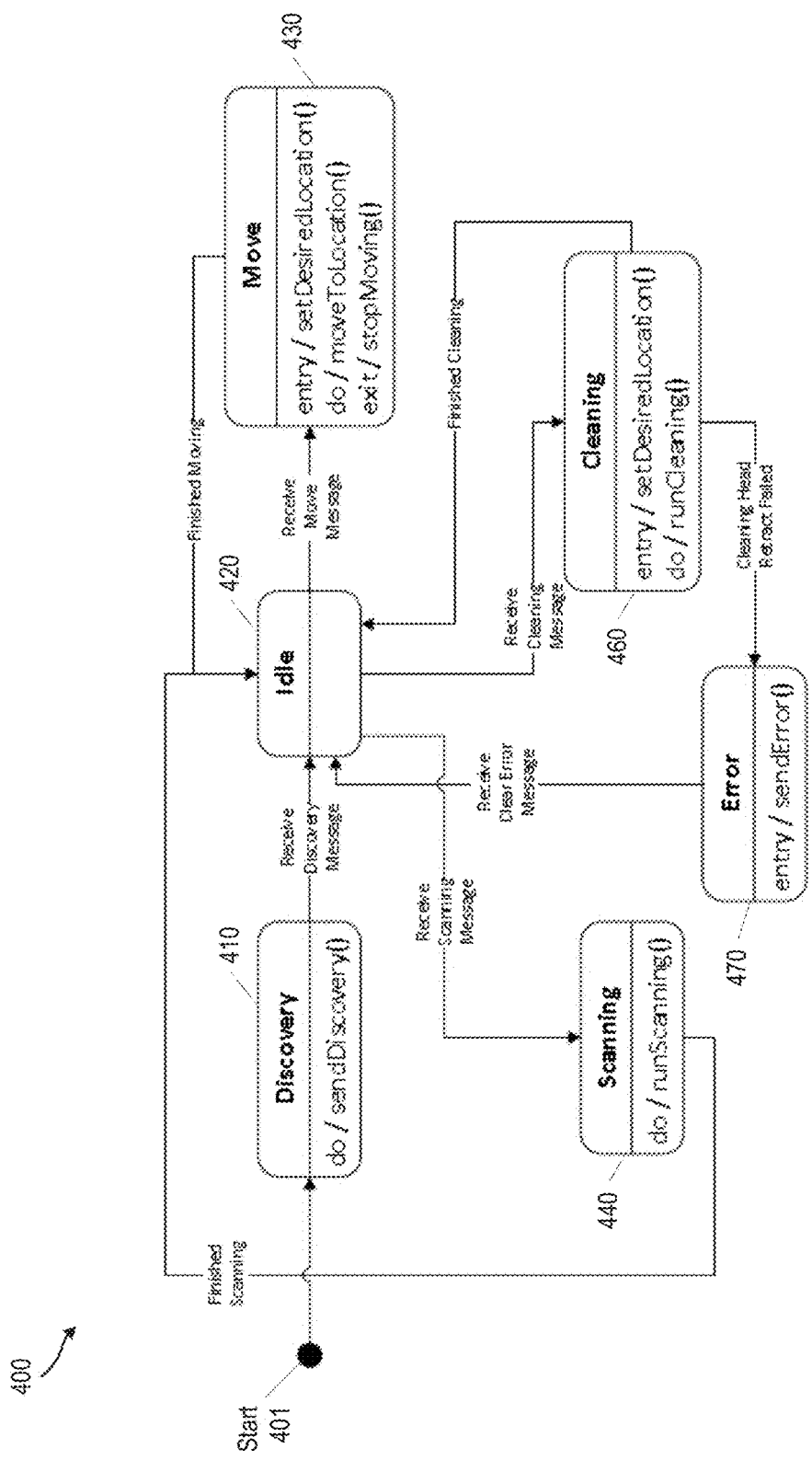
FIG. 4 is a flow diagram showing steps of a method for controlling the tube cleaning and inspecting system of FIG. 1.

FIG. 4 is an exemplary flow diagram showing steps of a method for controlling system 100, FIG. 1. Specifically, FIG. 4 shows high-level steps that are further described in FIGS. 5-8. Steps of method 400 are executed by processor 152 using software 155 stored in memory 154 of controller 150, FIG. 1 for example.

In step 401, method 400 starts. In an example of step 401, a user initiates system 100 to start via interface 156.

In step 410, discovery is performed to determine a presence of all system components. In an example of step 410, controller 150 communicates with puncher 120, locator 130 and two-axis stand 140 via communication path 158 to determine their initial state, for example online or offline.

In step 420, an idle step is performed. In an example of step 420, puncher 120, locator 130, and two-axis stand 140 remain idle while awaiting further commands from controller 150, FIG. 1.

In step 430, a move step is performed. In an example of step 430, two-axis stand 140 moves head 125 to a desired location. The desired location may be predetermined and stored in memory 154 or the desired location may be input by a user via interface 156. Step 430 is shown in further exemplary detail in FIG. 5 and described below.

In step 440, scanning is performed. In an example of step 440, locator 130 scans the face of tube bundle 110 by moving via two-axis stand 140, FIG. 1. Locator 130 is for example a laser sensor that illuminates the face of tube bundle 110 and receives reflected laser light. Step 440 is shown in further exemplary detail in FIG. 6 and described below.

In step 460, cleaning is performed. In an example of step 460, puncher 120 cleans tubes 111 of tube bundle 110, FIG. 1. Step 460 is shown in further exemplary detail in FIG. 7 and described below.

In step 470, an error is detected resulting in an error message being provided. In an example of step 470, puncher 120 fails to fully retract from one of tubes 111 of tube bundle 110, FIG. 1, as determined by controller 150 via a feedback device of puncher 120, As a result, an error message is provided to controller 150 and interface 156.

Figure 5:
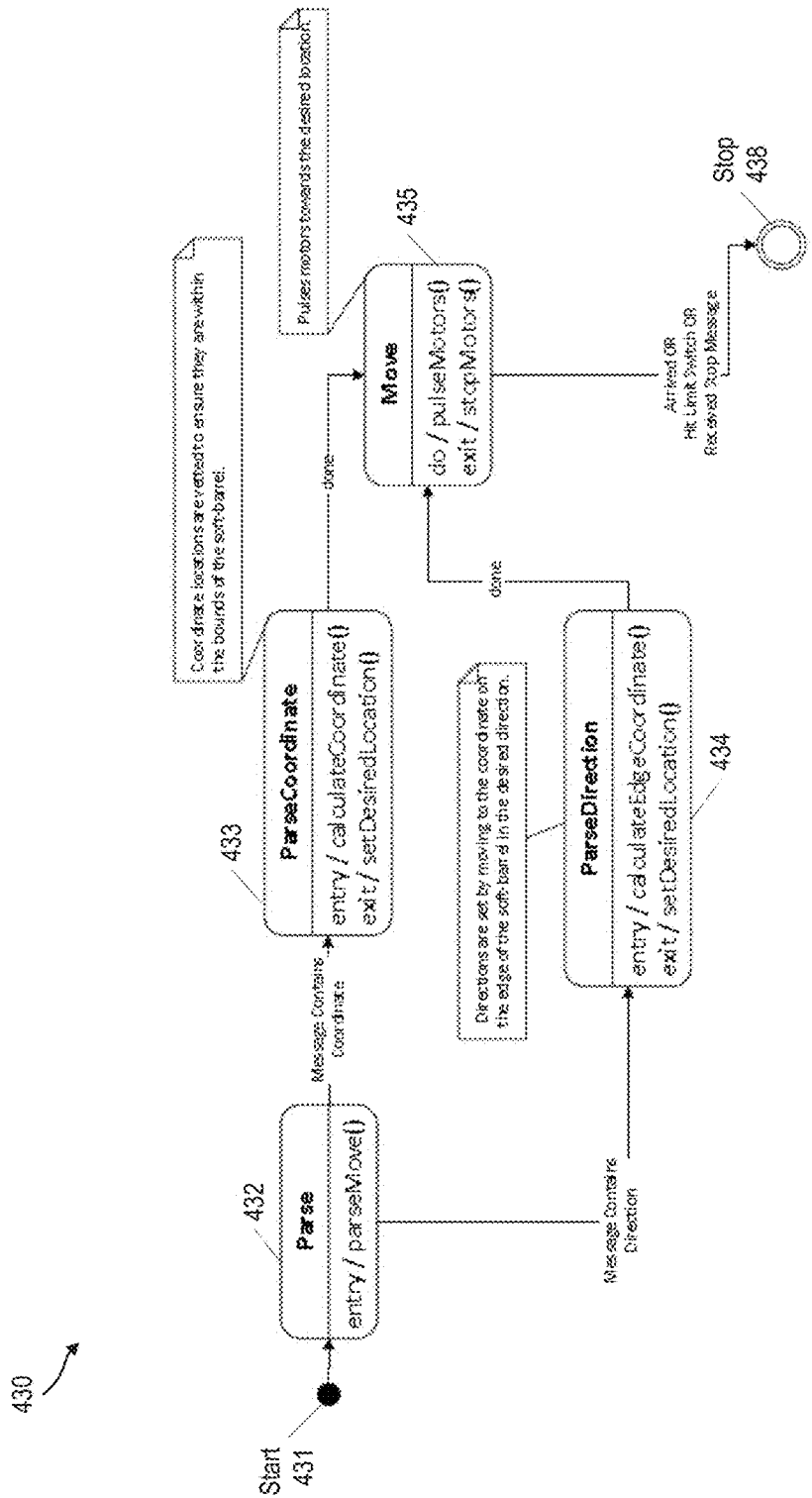
FIG. 5 is a flow diagram showing steps of a method for commanding movements of the tube cleaning and inspecting system of FIG. 1.

FIG. 5 is an exemplary flow diagram showing a subroutine of move step 430, FIG. 4 in further exemplary detail. In step 431, subroutine 430 starts. In an example of step 431, a user initiates subroutine 430 via interface 156 and provides a movement input to command head 125 to move to the desired location via two-axis stand 140.

In step 432, the movement input is parsed to determine if the movement input received in step 431 is a coordinate input or a direction input. If in step 432 a coordinate input is determined, subroutine 430 proceeds to step 433. An example coordinate input is an X, Y, Z position corresponding to a position along X, Y, Z reference axes 141, FIG. 1. Otherwise, if a direction input is received, subroutine 430 proceeds to step 434. An example direction input is to move the current X, Y, Z coordinate in an X, Y, Z direction along X, Y, Z reference axes 141, FIG. 1. Prior to moving in step 435, the coordinate and direction inputs are vetted to ensure they are within predetermined bounds.

In step 435, a movement is performed. In an example of step 435, head 125 is moved via two-axis stand 140 by appropriately pulsing X-motor 247, Y-motor 248, and Z-motor 249, FIG. 2 in order to arrive at the desired location determined from either step 433 or step 434.

In step 438, subroutine 430 stops. In an example of step 438, head 125 stops once arriving at the desired location. In another example of step 438 head 125 stops due to a limit switch being reached, such as third, fourth, fifth, or sixth limit switch 243, 244, 245, 246, respectively, of FIG. 2.

FIG. 6 is an exemplary flow diagram showing a subroutine of scanning step 440, FIG. 4 in further exemplary detail. Subroutine 440 is divided into two portions, separated by a dashed line in FIG. 4. In the upper portion above the dashed line, steps 441 to 450 perform movements for scanning, such as movements of head 125, FIG. 1. In the lower portion below the dashed line, steps 451 to 456 perform scanning functions with a scanning device, such as locator 130, FIG. 1 which is for example a laser sensor. The upper and lower portions of subroutine 440 are coordinated for performing in parallel to provide effective scanning.

In step 441, the upper portion of subroutine 440 starts. In an example of step 441, a user initiates subroutine 440 via interface 156 and provides a scanning command to move head 125 via two-axis stand 140 for scanning at least one of tubes 111 with locator 130.

Steps 442 through 449 command a series of movements for scanning. For example, steps 442 through 449 command head 125 to move along X, Y, Z reference axes 141 using two-axis stand 140, with locator 130 mechanically coupled to head 125 and aligned for scanning tubes 111 of tube bundle 110, FIG. 1. In an embodiment, a raster scan is performed via steps 442 to 449. Example movements performed via steps 442 to 449 are described as follows.

In step 442, head 125 moves up, which is best viewed as an upward direction along the Z-axis of X, Y, Z reference axes 141, FIG. 1. In step 443, head 125 moves in reverse, then it moves down, which is best viewed as a downward direction along the Z-axis of X, Y, Z reference axes 141, FIG. 1. The reverse direction is for example in a direction opposite of the previous move. In step 444, head 125 moves right, which is best viewed as towards the right side of the face of tube bundle 110 along the X-axis of X, Y, Z reference axes 141, FIG. 1, then moves down. In step 445, head 125 moves up, then moves down. In step 446, head 125 moves down. In step 447, head 125 moves in reverse before moving up. In step 448, head 125 moves right, and then moves up. In step 449, head 125 moves down, then moves up. In step 450, subroutine 440 stops.

In step 451, the lower portion of subroutine 440 starts. In an example of step 451, the lower portion of subroutine 440 is coordinated to start with the user initiated scanning command provided in step 441 and to stop with step 450. The lower portion of subroutine 440 determines whether locator 130 is scanning a face plate or a hole as described below for steps 452 through 456.

In a step 452, a face plate location is determined. In an example of step 452, locator 130 emits laser light and receives laser light reflected from a face plate of tube bundle 110 and determines, via controller 150, that the laser is illuminating the face plate of tube bundle 110 between tubes 111.

In step 453, a falling edge is determined, which indicates that a hole edge is being approached from the face plate towards a hole during scanning. In an example of step 453, locator 130 illuminates the edge of the facial opening of one of tubes 111 as approached from the face plate of tube bundle 110.

In step 454, a hole is determined. In an example of step 454, locator 130 illuminates the hole of the opening of one of tubes 111.

In step 455, a rising edge is determined, which indicates that the hole edge is being approached from the hole towards the face plate during scanning. In an example of step 455, locator 130 illuminates the edge of one of tubes 111 as approached from the respective hole.

In step 456, scanning data is transmitted. In an example of step 456, locator 130 transmits data to controller 150 via communication path 158 as locator 130 proceeds through steps 452 to 455.

FIG. 7 is an exemplary flow diagram showing a subroutine of cleaning step 460, FIG. 4 in further exemplary detail. In step 461, subroutine 460 starts. In an example of step 461, a user initiates subroutine 460 via interface 156 and provides a desired location corresponding to a desired one of tubes 111, FIG. 1.

In step 462, a move is made to align with a hole. In an example of step 462, the cleaning tool of puncher 120 is moved adjacent to an opening hole of one of tubes 111 via two-axis stand 140 and aligned with the hole via head 125. In an embodiment, locator 130 is used to determine the location of the cleaning tool of puncher 120 relative to the hole of one of tubes 111.

In steps 463 to 467, the alignment position is checked. In an example of steps 463 to 467, locator 130 is used to determine the location of the opening hole of one of tubes 111 by moving via two-axis stand 140 to scan the edge and center of one of tubes 111. Specifically, in step 463, a top edge of the facial opening of the tube is checked. Similarly, in step 464 a bottom edge is checked, in step 465 a center of the hole is checked, in step 466 a right edge is checked, and in step 467 a left edge is checked.

In step 468, the tube is cleaned. In an example of step 468, the cleaning tool of puncher 120 is extended into one of tubes 111 until reaching a physical limit, the cleaning tool spins to scrub the interior surface of the tube, and the cleaning tool of puncher 120 is retracted. Step 468 is carried out with movements described in a series of sub-steps 470 to 473.

In step 470, a cleaning apparatus is extended into a tube. In an example of step 470, the cleaning tool of puncher 120 is extended into one of tubes 111 via two-axis stand 140.

In step 471, the cleaning apparatus is retracted from the tube. In an example of step 471 the cleaning tool of puncher 120 is retracted from one of tubes 111 via two-axis stand 140.

In step 472, failure to extend the cleaning apparatus into the tube is identified. In an example of step 472, failure of the cleaning tool of puncher 120 to extend into one of tubes 111 is determined by controller 150 via a feedback device, such as a Hall-effect sensor. Following step 472, subroutine 460 proceeds to step 478.

In step 473, failure to retract the cleaning apparatus from the tube is identified. In an example of step 473, failure of the cleaning tool of puncher 120 to retract from one of tubes 111 is determined by controller 150 via a feedback device, such as a Hall-effect sensor. Following step 473, subroutine 460 proceeds to step 478.

In step 475, a limit switch is reached. In an example of step 475, third limit switch 243, FIG. 2 is reached by movement along two-axis stand 140. Step 475 may produce an error message to interface 156 indicating that the limit switch has been reached. Following step 475, subroutine 460 proceeds to step 478.

In a step 476, failure to find a hole is identified. In an example of step 476, locator 130 fails to determine the location of the hole of one of tubes 111. Following step 476, subroutine 460 proceeds to step 478.

In a step 477, the desired location is determined to be outside of a predetermined bound. In an example of step 477, controller 150 determines that the desired location is outside of the predetermined bound of coordinates accessible to locator 130 via two-axis stand 140. Following step 477, subroutine 460 proceeds to step 478.

In a step 478, an acknowledgement message is sent. In an example of step 478, controller 150 acknowledges the state of system 100 and sends an acknowledgement message to interface 156, FIG. 1. The acknowledgement state may include acknowledging that a limit switch has been reached in step 475 for example.

In a step 479, an acknowledgement receipt is sent. In an example of step 479, interface 256 sends an acknowledgement receipt to controller 250, FIG. 2.

Figure 8:
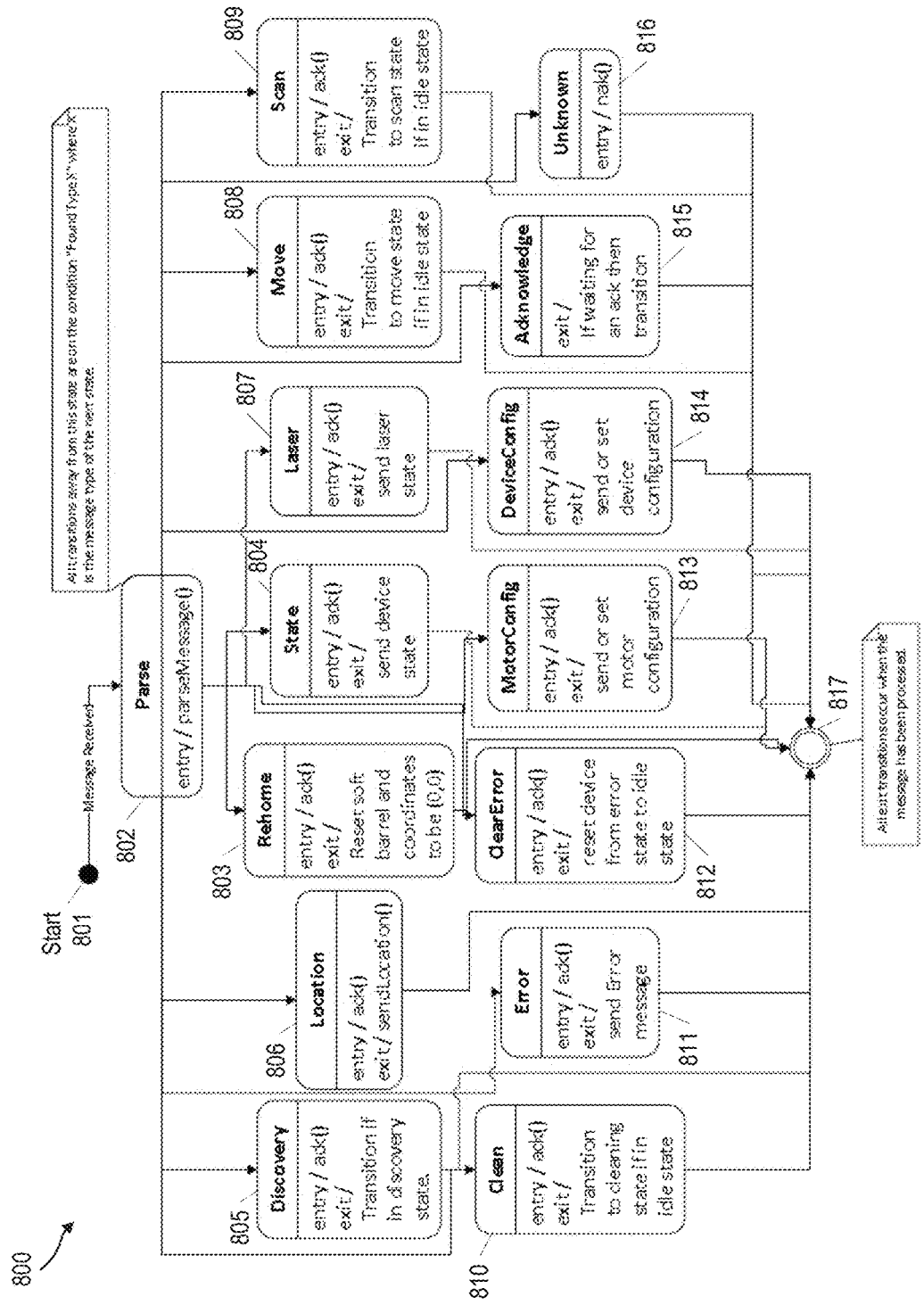
FIG. 8 is a flow diagram showing steps of a method for communicating between components of tube cleaning and inspecting system of FIG. 1.

FIG. 8 is a flow diagram showing steps of a method 800 for communicating between components of tube cleaning and inspecting system 100, FIG. 1. In a step 801, method 800 starts by receiving a message. In an example of step 801, a message is received from interface 156, FIG. 1.

In a step 802, the message is parsed. Step 802 is an example of step 432, FIG. 5.

In a step 803, a position is rehomed. In an example of step 803, controller 150 positions head 125 to rehome to a baseline coordinate, such as 0, 0, 0 along X, Y, Z reference axes 141, FIG. 1.

In a step 804, a device state is determined. In an example of step 804, controller 150 determines the state of two-axis stand 140, FIG. 1, such as ready or busy.

In a step 805, discovery is performed to determine a presence of all system components. Step 805 is an example step 410, FIG. 4.

In a step 806, a location is determined. In an example of step 806, controller 150 determines the location of head 125 along X, Y, Z reference axes 141.

In a step 807, a laser state is provided. In an example of step 807, controller 150 controls locator 130 to an on or off state.

In a step 808, a move is provided. In an example of 808, controller 150 moves head 125 via two-axis stand 140 to a desired location. Step 808 is an example of move subroutine 430, FIG. 5.

In a step 809, a scan is performed. In an example of step 809, controller 150 determines whether locator 130 is scanning or idle. Step 809 is an example of subroutine 440, FIG. 6.

In a step 810, cleaning is performed. Step 810 is an example of subroutine 460, FIG. 7 for cleaning one of tubes 111, FIG. 1.

In a step 811, an error is determined and an error message is sent. Step 811 is an example of step 470, FIG. 4.

In a step 812, an error is cleared. In an example of step 812, controller 150 clears an error message presented in interface 156.

In a-step 813, a motor configuration is set. In an example of step 813, controller 250 sends a command to set the configuration for X-motor 247, FIG. 2.

In a step 814, a device configuration is set. In an example of step 814, controller 250 sends a command to set the configuration for puncher 220, FIG. 2.

In a step 815, an acknowledgement message is sent. Step 815 is an example of step 478, FIG. 7, in which controller 150 acknowledges the state of system 100 and sends an acknowledgement message to interface 156, FIG. 1.

In a step 816, an unknown entry is made for messages parsed in step 802 with undetermined instructions.

In a step 817, method 800 ends. In an example of step 817, method 800 exits when the message parsed in step 802 has been processed accordingly.

FIG. 9 is a schematic drawing of a two-axis stand 900, which is an example of two-axis stand 140, FIG. 1. Two-axis stand 900 includes a head 925, which is an example of head 125, FIG. 1, configured to hold a puncher such as puncher 120, FIG. 1. Two-axis stand 900 also includes a first motor 910 and a second motor 920, which are examples of Y-motor 248 and X-motor 247, FIG. 2, respectively. A third motor 930 is another example of X-motor 247, which may work in concert with second motor 920.

Second and third motors 920 and 930 may be respectively coupled with a lead screw 932(1), 932(2) which translate motor rotation into linear X-axis travel as indicated by coordinate system 902. Lead screws 932 may impart linear motion to a gantry 934 coupled to a bearing rail 936 (lead screws 932 may be located within rail 936) to which components, such as brush and locator discussed above are mounted. The linear rails allow the gantry cross bar to move in the X-axis. The rails 936 may be made of steel (or other material) whereas the bearing attached to the gantry cross bar is made of a material that does not require lubrication in order to easily slide back and forth. The weight of the cross bar may be maintained by these rails 936.

The gantry 934 may include a cross bar including the mounting for the y motor, the pulley connection to the gantry head, and the gantry head. The gantry 934 may move in the x-axis when the device needs to move the gantry head in the x-axis. The gantry 934 may be attached to the frame via a linear bearing system which requires no lubrication. In embodiments the lead screws 932 are attached to the motors 920, 930 via a coupler (not shown) that prevents the lead screws from disconnecting from the motors. This allows for a large amount of error to be present in the attachment of the lead screws to the motors without causing problems with the motion of the device.

A frame 950 may provide structure to components of two-axis stand 900 and a plurality of flange mounts 960 enables mounting to heat exchanger 115 for interfacing with tube bundle 110 for example. Mounts 960 may be half-inch-thick steel. Mounts 960 may include several different hole sizes milled out on one side and a long slot drilled on the other. The slotted side attaches to the frame and can be used for adjusting the effective length of the mounting bar. The hole side may attach to the chiller. The various hole sizes allow the mounting bar to be attached to several different types of chiller. A housing 952 may be mounted to frame 950 for housing electrical components associated with stand 900, such as controls for operating motors 910, 920, 930, and additional electrical connections to external components such as any one or more components of system 100 discussed above. Housing 952 may include a debugging port to allow for easy access to debugging information produced by a controller therein. Connections to and from stand 900 may be made through a single cable coupled to components within housing 952. Frame 950 may further include hook mounts 954 which may have similar features to those discussed above with respect to mounts 960 and are for coupling an overhead lift thereto. Only one flange mount 960 is labeled in FIG. 9 for clarity of illustration. An emergency stop unit 970 provides a button for a user to stop all motors of two-axis stand 900 in the event of an emergency, which is an example of stand E-stop 241, FIG. 2.

Stand 900 may further include limit switches (not shown), which are examples of limit switches 221 and 222, discussed above. There may be four (or more or fewer) limit switches, such as two (2) for each axis of movement. The X-positive and X-negative limit switches may be placed on the same side of the frame as the cross bar and the x motor. They may be positioned such that the cross bar motion will trigger them at opposing ends of its range of travel. The Y positive and Y negative limit switches may be placed on the gantry head. A steel tab is placed such that the motion of the gantry head will cause the tabs to trigger the y limit switches at the extreme ends of the gantry heads' travel. These limit switches are constantly read by a controller and are used to prevent motion if the frame is at the extreme limits of its range of motion.

Figure 10:
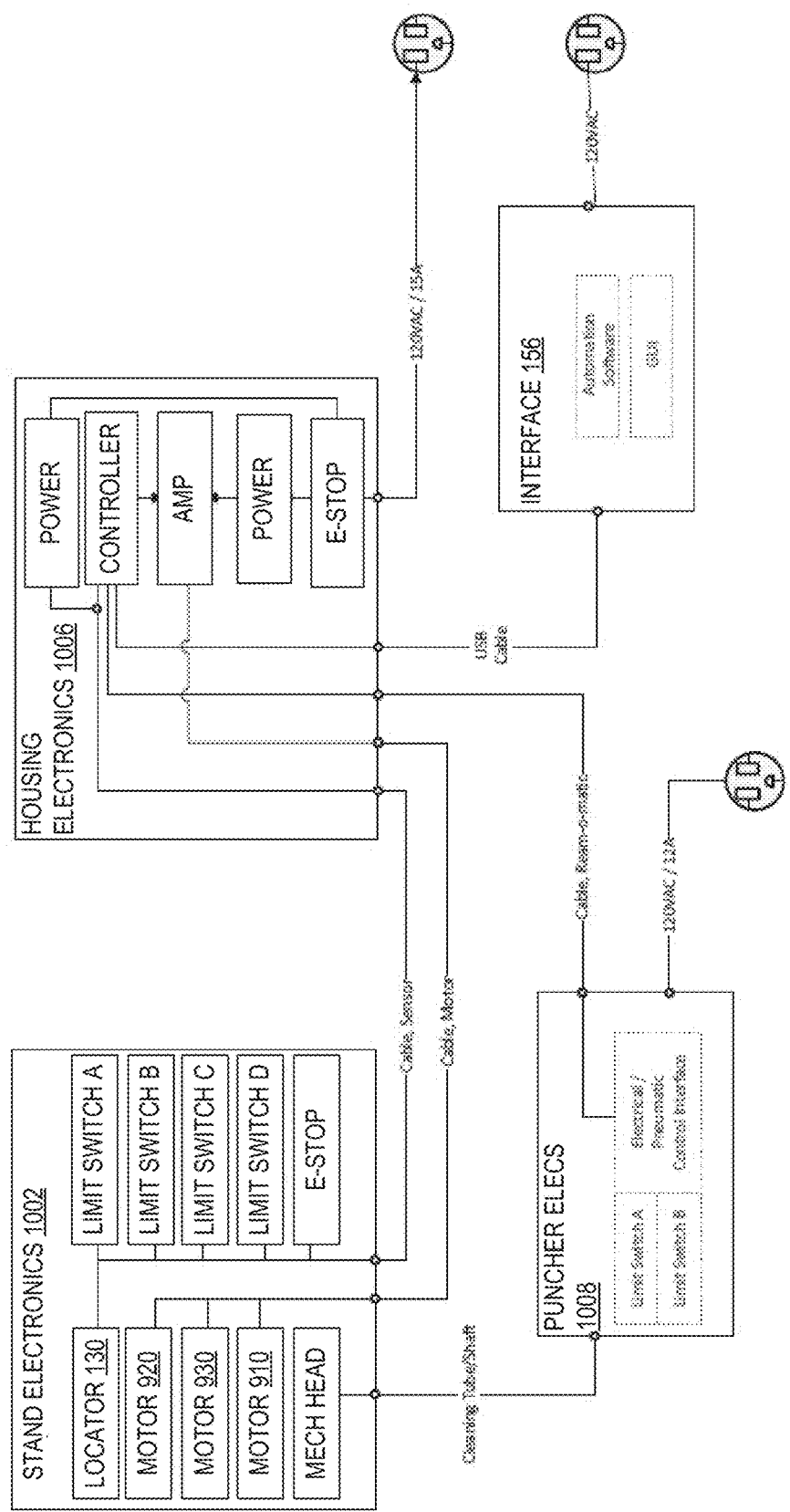
FIG. 10 depicts an overview diagram of the electrical system of the tube punching system utilizing stand of FIG. 9, in embodiments.

FIG. 10 depicts an overview diagram of the electrical system 1000 of the tube punching system utilizing stand 900, of FIG. 9, in embodiments. System 1000 includes the electronics on the stand 900, those in the electronics housing 952, those in the cleaner, and the laptop used for the user interface (e.g. interface 156 discussed above), and may include any one or more of the components to those discussed above with respect to FIG. 2.

Stand electronics 1002 includes electronics for controlling stand 900. For example, stand electronics 1002 includes electronics for controlling locator 130 (such as a laser calibrated to provide a binary signal that indicates if there is empty space or an object in front of the laser). The locator 130 may be used to determine if the device sees the chiller plate or a tube at any given location. The locator 130 may have an Ip68 rating or better, in embodiments. Electronics 1002 may include controls for motors 910, 920, and 930, as well as limit switches (four shown) for controlling maximum movement of stand 900. Electronics may further include an E-stop switch (such as E-stop 241, discussed above) for manually stopping movement of stand 900, Stand electronics 1002 represent electronics outside of housing 952.

Housing electronics 1006 may include electronics located in housing 952, including a power supply for the electronics in housing 952, amplifiers for motors 910, 920, 930, motor power supplies, and an additional E-stop as discussed above. In embodiments the E-stop only stops control of the stand 900 and not the cleaning device (e.g. puncher 220).

Puncher electronics 1008 includes electronics associated with the puncher. For example, puncher may be puncher 220. In embodiments, the puncher (including puncher 120, 220) is a Goodway Ream-A-Matic including four connections to the overall system. It is important to note that the Goodway system is a combination of pneumatic and electrical control. The pneumatic lines are used on the gun end of the device where water is present while the electrical control signals are used inside of the machine proper where water cannot reach. The systems disclosed herein may be integrated with the pneumatic signals in order to ensure that the Goodway system can be reverted to a manual system. The signals for extending and retracting the cleaning brush of the puncher system may be both pneumatic. These signal lines build pressure when activated and bleed pressure when deactivated. The lines are normally open or deactivated. These are summarized in the following table:

| Name | Description |
| --- | --- |
| Hall-Effect Sensor | The power supply for the peripheral equipment on the system |
| Extending Limit Switch | The micro-control board which runs the embedded device software and is connected to the signal line of all sensors |
| Extending Control | The amplifiers for the motor control signals |
| Retracting Control | The power supplies for the motors on the gantry frame |

The hall-effect sensor may be actually mounted to the gun end of the puncher 120, 220 (which itself is mounted to the gantry head). This sensor may be used to detect a magnet that is attached to the cleaning brush. This sensor may be triggered when the brush is fully retracted from the chiller. This allows the controller to know when to stop the retracting motion. Puncher 120, 220 may include a latching hall-effect sensor that determines when a magnet on the puncher has emerged from the tubes. As such, the latching sensor may stay triggered in the case that the magnet passes by the sensor and then goes out of range. This system may allow the system to always stop the puncher brush at an appropriate place in the system when it emerges from the chiller.

The extending limit switch may be a button that may be attached to the existing limit switch on the back of the puncher 120, 220. The existing switch may be a pressure release value that bleeds pressure from the extending control signal when pressed. This prevents the line from extending past a physical limit. The button that has been attached to this existing system is an electrical signal that informs the automated system when the limit has been reached.

The extending control line may be an electrical signal that closes a valve on the puncher in order to build pressure in the extending control line internal to the puncher system. This activates the motor in the extending direction.

The electronics may send signals to an interface, such as interface 156.

Components within the embodiments herein may utilize one or more of the following protocols, which are intended to be an example only and not limiting in scope. The protocol may use a single handshake to indicate when messages between devices have been received. That is, the either side of the system will respond to any message with either an acknowledgement which states that the message has been received or a negative acknowledgement indicating there was a problem. If no acknowledgement is sent, then there was no message received. The protocol follows a simple message format as follows:

| Segment | Start | Type | Data Count | Data | CRC | End |
| --- | --- | --- | --- | --- | --- | --- |
| Bytes: | 1 | 1 | 2 | n | 1 | 1 |

The start of a message may be 0xF1 while the end of a message may be 0xF2. In order to prevent those values from being sent in the data of a message, byte stuffing may be used. Byte stuffing indicates that anytime 0xF0, 0xF1, or 0xF2 are seen in the data of a message, that byte is replaced with the two bytes 0xF0 0x00, 0xF0 0x01, or 0xF0 0x02 respectively. Byte stuffing is performed as the last step before transmitting a message and un-stuffing occurs as soon as bytes are received.

The Data Count segment of the message indicates the amount of data contained within the Data segment. This value is an unsigned 16-bit integer. This provides a verification step in which the receiver can verify that the proper amount of data was sent by the sender. If the value of the Data Count does not match the number of bytes received, then the message can be assumed to be corrupt and is discarded and a negative acknowledgement is sent.

The Data Count segment of the message indicates the amount of data contained within the Data segment. This value is an unsigned 16-bit integer. This provides a verification step in which the receiver can verify that the proper amount of data was sent by the sender. If the value of the Data Count does not match the number of bytes received, then the message can be assumed to be corrupt and is discarded and a negative acknowledgement is sent.

The CRC then provides another layer of verification by indicating whether the data was received correctly. The CRC is an unsigned 8-bit integer. The CRC is calculated by performing a logical XOR on the Type, Data Count, and Data segments. The value calculated can then be compared to the value received. If the values do not match, then the message can be assumed to be corrupt and is discarded and a negative acknowledgement is sent.

The Data segment contains all of the data for the message. Some messages do not contain data. In these cases the Data segment is missing from the message and the Data Count value is 0. All data is transmitted in Big-Endian format (most significant byte first).

The Type segment indicates the type of message that is being sent. Note that many message types have a different purpose when used to transmit from the interface to the device versus from the device to the interface. For instance, the Scan message sent from the interface (e.g. interface 156) to the device (e.g. locator 130) indicates that the locator 130 should move into the scanning state and begin scanning while the Scan message sent from the locator 130 to the interface 156 provides a list of scanned points. The types are shown in the following table:

| Type | Description |
| --- | --- |
| F | Discovery message, indicates that the system is waiting for a connection. |
| D | To Discovery message which resets the device |
| R | Origin Reset which forces the system to reset its current location to (0, 0) |
| H | Requests or returns the current head location in mm. |
| T | Requests or returns the device state |
| L | Requests or returns the current state of the detection laser |
| M | Request for device movement |
| S | Requests the device move to the scanning state or a returned set of scanned points |
| C | Requests the device move to the cleaning state or a returned cleaning status |
| E | Requests the current error mode or returns the current error mode |
| N | Clears any device error so that normal operation can begin |
| A | Requests, returns, or sets the motor configuration for the device |
| B | Requests, returns, or sets the device configuration for the device |
| K | Acknowledgement message |
| G | Negative acknowledgement message |

The Discovery message may be sent repeatedly while the locator 130 is in the discovery state until it receives a Discovery message from the interface 156. The Discovery message contains no data.

The To Discovery message may be sent by the interface 156 to the locator 130 to reset the device back to the discovery state. The To Discovery message contains no data.

The Origin Reset message is sent by the interface 156 to the locator 130 in order to reset the coordinate system on the locator 130. The effect is to set the locator 130 current location to be (0,0) which in turn changes the location of the software limits on the locator 130 movement. The Origin Reset message contains no data.

When sent from the interface 156 to the locator 130, the Head Location message acts as a request for the current location of the gantry head and the message contains no data. When sent from the locator 130 to the interface 156, the Head Location message contains the current head location. The following table shows the data contained in the message:

| Name | Data Type | Unit | Description |
|---|---|---|---|
| x | Signed 32-bit Integer | mm | Current X-Coordinate |
| y | Signed 32-bit Integer | mm | Current Y-Coordinate |

When sent from the interface 156 to the locator 130, the Device State message acts as a request for the current state of the locator 130 and contains no data. When sent from the locator 130 to the interface 156 it contains the current state of the locator 130 plus the error state of the device. The following table shows the data contained in the message:

| Name | Data Type | Unit | Description |
|---|---|---|---|
| State | 8-bit Integer | n/a | 0 for idle, 1 for moving, 2 for scanning, 3 for cleaning, 4 for error |
| Error | 8-bit Integer | n/a | 0 for no error, 1 for an error cleaning, 2 for the cleaning head getting stuck within the chiller, 3 for the device being unable to move |

When sent from the interface 156 to the locator 130, the Laser State message acts as a request for the current state of the laser and contains no data. When sent from the locator 130 to the interface 156 it contains the current state of the laser. The following table shows the data contained in the message:

| Name | Data Type | Unit | Description |
|---|---|---|---|
| State | 8-bit Integer | n/a | 0 for plate and 1 for a hole |

The Movement message is sent from the interface 156 to the locator 130 to indicate a location to which the locator 130 should move the gantry head or a direction in which the head should move. There are two configurations for the data of this message. The following table shows the data contained in the message for moving to a specific coordinate:

| Name | Data Type | Unit | Description |
|---|---|---|---|
| type | 8-bit Integer | n/a | C for coordinate |
| x | Signed 32-bit Integer | mm | The X-Coordinate to move to |
| y | Signed 32-bit Integer | mm | The Y-Coordinate to move to |

The following table shows the data contained in the message for moving in a specific direction:

| Name | Data Type | Unit | Description |
|---|---|---|---|
| type | 8-bit Integer | n/a | D for direction |
| direction | 8-bit Integer | n/a | W for up, A for left, S for down, D for right, Q for up and left, E for up and right, Z for down and left, and C for down and right |

When sent from the interface 156 to the locator 130 the message attempts to get the locator 130 to move into the scanning state and contains no data. When sent from the locator 130 to the interface 156 the message contains a list of coordinates with edge and directional information attached. The following table shows the data contained in the Scan message. Note that the x, y, and info elements are repeated in order for each coordinate contained in the message.

| Name | Data Type | Unit | Description |
|---|---|---|---|
| State | 8-bit Integer | n/a | D for direction |
| count | Unsigned 16-bit Integer | n/a | The number of coordinates contained in the message |
| x | Signed 32-bit Integer | mm | The location of the scanned point's x coordinate |
| y | Signed 32-bit Integer | mm | The location of the scanned point's y coordinate |
| info | 8-bit Integer | n/a | The edge and directional information for the coordinate. The two least significant bits indicate the edge type (00 for falling edge, 01 for rising edge) while the next two bits indicate the direction (10 is up, 11 is down). |

When sent from the interface 156 to the locator 130 the cleaning message indicates a specific location at which to clean. The following table describes the data contained in the interface to device message:

| Name | Data Type | Unit | Description |
|---|---|---|---|
| x | Signed 32-bit Integer | mm | The X-Coordinate to clean at |
| y | Signed 32-bit Integer | mm | The Y-Coordinate to clean at |

When sent from the locator 130 to the interface 156 the message contains a report of the cleaning performed at the requested location. Note that there are six possible statuses that can be returned with the message. 0 indicates that the operation completed successfully. 1 indicates that the locator 130 failed to extend all the way to trigger the physical limit switch and instead timed out. 2 indicates that the location could not be verified as a hole. 3 indicates that the location could not be reached due to software limits on the movement. 4 indicates that a physical movement limit switch was triggered during the verification step. 5 indicates that the tube was unable to fully retract and trigger the Hall Effect sensor and is thus expected to be stuck in the chiller. Status 5 is the fatal error that kills operation of the locator 130 until the error has been cleared. The following table describes the data contained in the device to interface message:

| Name | Data Type | Unit | Description |
|---|---|---|---|
| status | 8-bit Integer | n/a | 0 for success, 1 for an extend warning, 2 means the location |

-continued

| Name | Data Type | Unit | Description |
|---|---|---|---|
| | | | was not a hole, 3 means the location could not be reached, 4 means a physical limit switch was triggered, 5 means the tube is stuck in the chiller |
| x | Signed 32-bit Integer | mm | The X-Coordinate that was cleaned |
| y | Signed 32-bit Integer | mm | The Y-Coordinate that was cleaned |

The Error message is sent from the interface 156 to the locator 130 to request the current error state of the locator 130 and contains no data. The Error message is sent from the locator 130 to the interface 156 when an error occurs or in response to an error state request and contains data on the message. The following table describes the data elements of the message:

| Name | Data Type | Unit | Description |
|---|---|---|---|
| type | 8-bit Integer | n/a | the type of error |
| message | 8-bit character string | n/a | A string that describes the error |

When sent from the interface 156 to the locator 130 the Clear Error message indicates to the locator 130 that there is no longer any error and operation can resume. This sets the device into the idle state. The message contains no data.

When sent from the interface 156 to the locator 130 the message can either set the motor configuration or request the current configuration. To request the current configuration, the message is sent with no data. To send an updated configuration the message is sent with data. The data for the motor configuration message described in the following table:

| Name | Data Type | Unit | Description |
|---|---|---|---|
| Speed X | 32-Bit Float | steps/s | The maximum speed in steps per second in the x-axis |
| Speed Y | 32-Bit Float | steps/s | The maximum speed in steps per second in the y-axis |
| Accel X | 32-Bit Float | steps/s^2 | The acceleration in step/s$^2$ in the x-axis |
| Accel Y | 32-Bit Float | steps/s^2 | The acceleration in step/s$^2$ in the y-axis |
| Steps X | 32-Bit Float | steps/mm | The number of steps to a millimeter in the x-axis |
| Steps Y | 32-Bit Float | steps/mm | The number of steps to a millimeter in the y-axis |

When sent from the locator 130 to the interface 156 the message contains the current motor configuration. The data for the message follows the same format as in the previous table.

When sent from the interface 156 to the locator 130 the message can either set the locator 130 configuration or request the current configuration. To request the current configuration, the message is sent with no data. To send an updated configuration the message is sent with data. The data for the locator 130 configuration message described in the following table:

| Name | Data Type | Unit | Description |
|---|---|---|---|
| Hole Diameter | 32-Bit Float | mm | The average diameter of the holes to clean in mm |
| Laser Offset X | 32-Bit Float | mm | The offset from the laser to the cleaning head in x |
| Laser Offset Y | 32-Bit Float | mm | The offset from the laser to the cleaning head in y |
| Barrel Length | 32-Bit Float | ft | The length of the barrel in feet |
| Barrel Diameter | 32-Bit Float | mm | The diameter of the chiller barrel for the software limit |
| Cleaning FPS | 32-Bit Float | ft/s | The expected number of feet cleaned per second |
| Edge buffer | 32-Bit Float | mm | The distance to keep from the software barrel edge |
| Scan Resolution | 32-Bit Float | mm | Distance between scan columns in mm |

When sent from the locator 130 to the interface 156 the message contains the current locator 130 configuration. The data for the message follows the same format as in the previous table.

When sent from either the interface 156 or the locator 130 the Acknowledgement message is simply meant to indicate that a message was received. The Acknowledgement message contains a single byte of data that is the message type of the acknowledged message as indicated in the following table:

| Name | Data Type | Unit | Description |
|---|---|---|---|
| type | 8-bit Integer | n/a | The type of the message being acknowledged |

When sent from either the interface or the device the Negative Acknowledgement message is simply meant to indicate that a message was not successfully received. The message contains a single byte of data that is meant to indicate why the message failed as indicated in the following table:

| Name | Data Type | Unit | Description |
|---|---|---|---|
| reason | 8-bit Integer | n/a | S for a data size mismatch, C for a CRC mismatch, U for an unknown message |

The embedded software operates as a state machine that can asynchronously receive and respond to messages. Receipt of some messages is dependent on the state of the device. However, many of the messages that request data are responded to no matter the device state. One key point for the embedded system is that it keeps track of the head location and a software barrel that limits its movement. This is so that the head can be guaranteed to never move outside of the chiller barrel on marine end barrels. The software limit is defined by the current barrel diameter in the device configuration and the current origin of the coordinate system for the device. The origin can be reset using the Reset Origin message and the barrel diameter can be reset using the Device configuration message, both from the user interface.

Figure 11:
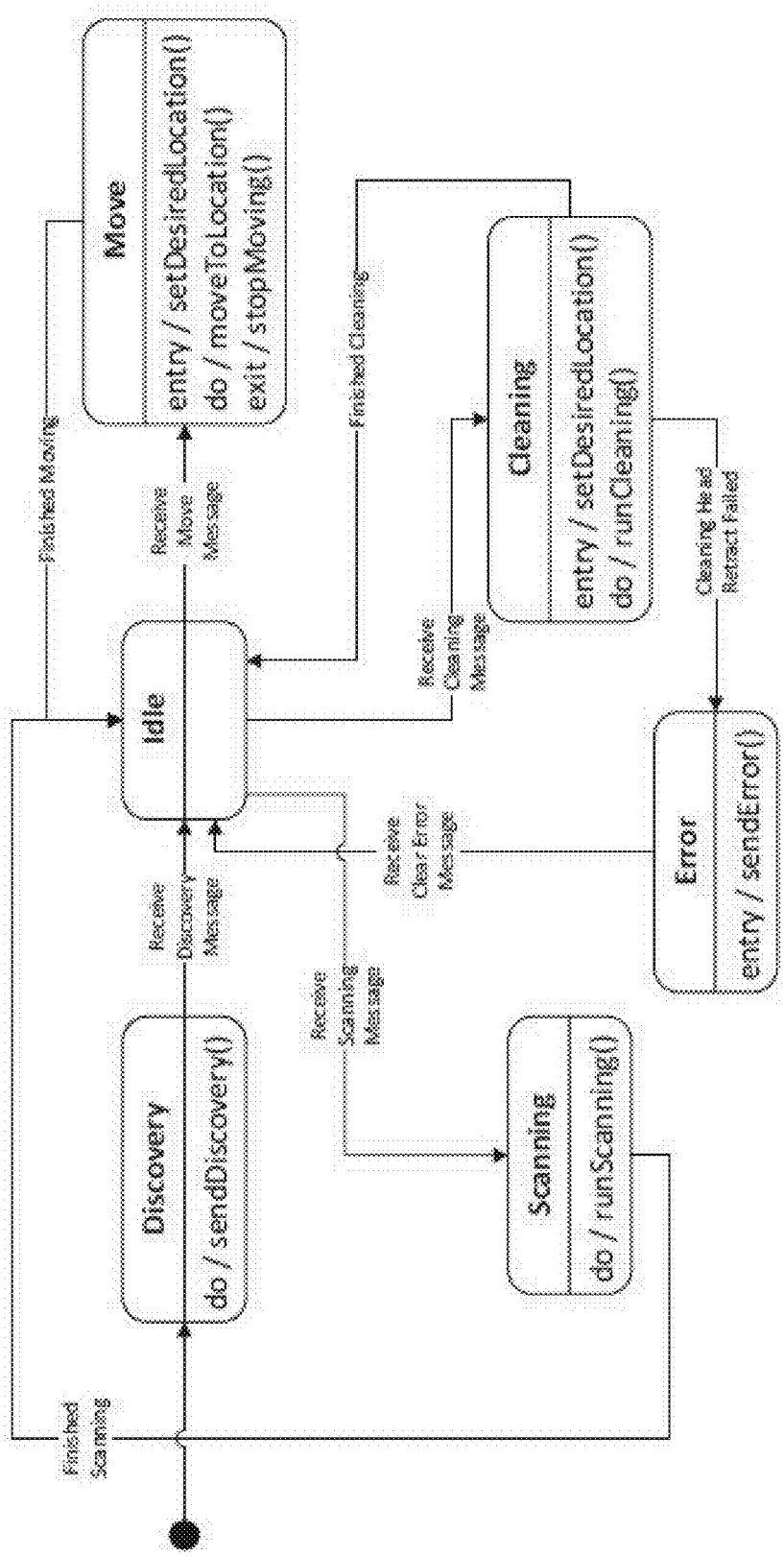
FIG. 11 shows the high level states used by embodiments of the systems described herein.

FIG. 11 shows the high level states used by embodiments of the systems described herein. The discovery state is the initial state for the system where the locator 130 waits until a user interface (e.g. interface 156) has connected to it. The idle state is where the locator 130 waits for input from the user interface and performs no actions of its own. The move state is where the locator 130 is attempting to move in a direction or to a coordinate.

Figure 12:
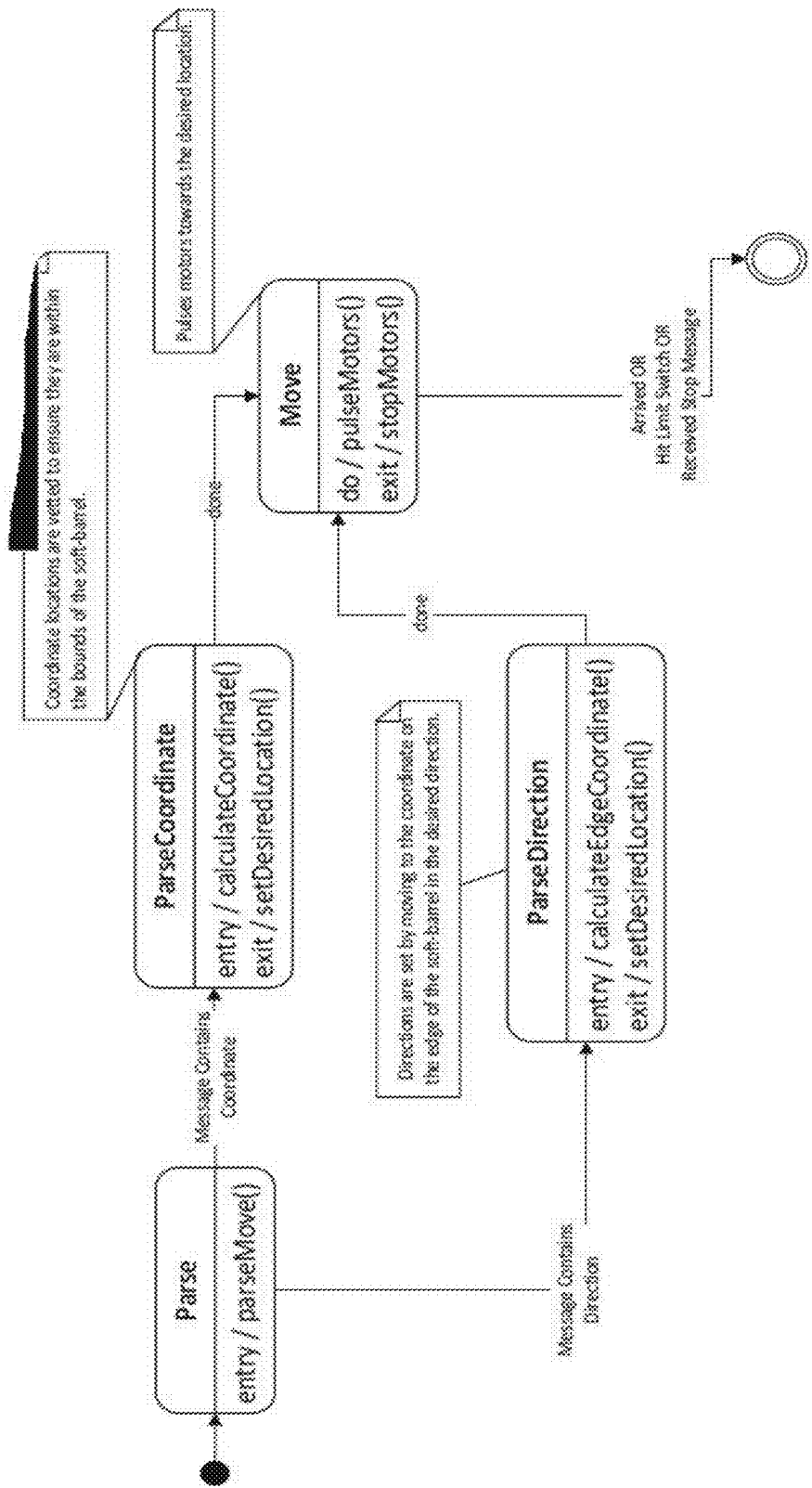
FIG. 12 shows the sub-states of the high level move state shown in FIG. 11, in embodiments.

FIG. 12 shows the sub-states of the high level move state shown in FIG. 11, in embodiments. The locator 130 enters the move state from the idle state and when a Move message is received. The locator 130 first parses the received message and then calculates the location to which it should move. For a coordinate move the locator 130 determines if the coordinate is inside or outside of the software barrel. If it is inside, then it simply uses the provided coordinate. If it is outside, then it draws a line between its current location and that point and moves to the intersection between the circle centered at the current origin with a diameter of the barrel diameter minus the edge buffer. For a directional move the device performs the aforementioned calculations after selecting a point in the appropriate direction that is definitely outside of the barrel diameter. The locator 130 then pulses the motors (e.g. motors 910, 920, 930) until it reaches the calculated location.

The scan state is where the locator 130 acquires information about the surface of the chiller in order to determine where the hole centers are. It does this by moving over a set of columns on the surface of the chiller, using the locator 130 to scan for holes. This movement is done from left to right and starting at the current position of the gantry head when the state is entered. It may be up to the operator to move the device to the desired starting location for the scanning state.

Figure 13:
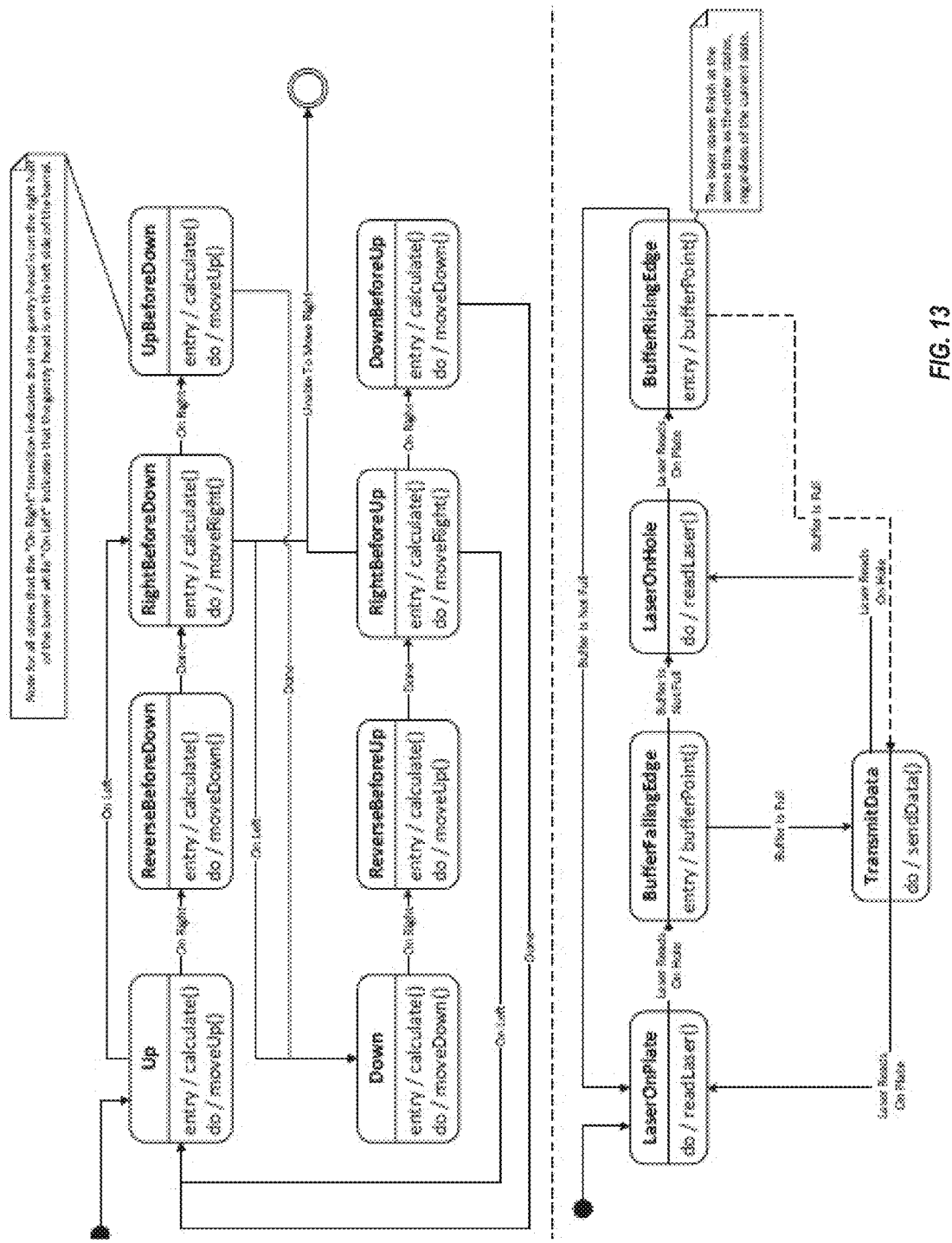
FIG. 13 depicts a state scan for a cleaning device, such as system 100 of FIG. 1, in embodiments.

While the locator 130 is on the left half of the software barrel it moves up, then right, then down, then right then up (as indicated by the states shown in FIG. 13). However, on the right side of the software barrel, the device inserts a correction back towards the center of the barrel before moving to the right and then another correction back to the edge of the barrel before continuing with the scan. This is to prevent the device from ever leaving the confines of the software barrel limits.

While the locator 130 is moving in either the up or down state it buffers points discovered by the laser. When the laser detects a significant change in elevation it marks that point. If the change was from a close object to a far object, then the device marks that point as a falling edge. If the change was from a far object to a close object, then the device marks that point as a rising edge. The device also marks the direction that the device was traveling when the point was found.

Figure 14:
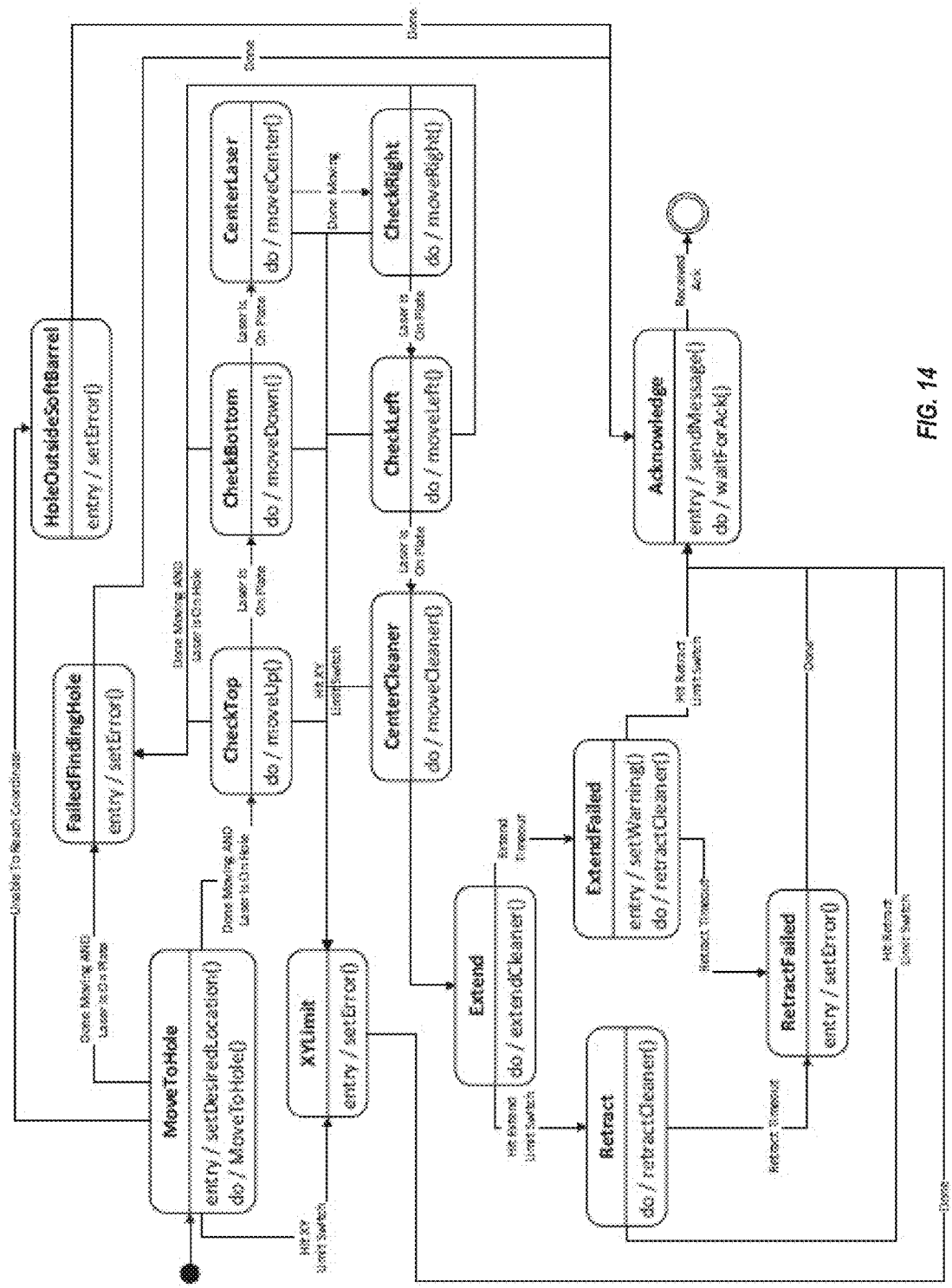
FIG. 14 shows the sub-states for the high level cleaning state, in embodiments.

FIG. 13 depicts a state scan for a cleaning device, such as system 100 of FIG. 1, in embodiments. In the cleaning state, the embedded device (e.g. system 100 including puncher 120, 220) attempts to clean a hole at a location given by the user interface (e.g. interface 156). The puncher 120 may enter the cleaning state if it is in the idle state and it receives a message from the user interface 156. FIG. 14 shows the sub-states for the high level cleaning state, in embodiments.

The system 100 first attempts to move the locator 130 to the coordinate given in the message. If the system 100 is unable to move to the location because it is outside of the software barrel or because it reaches a physical limit switch, then it reports failure back to the user interface 156 and leaves the cleaning state.

If the move is successful then the system 100 attempts to verify that the coordinate is actually over a hole. It does this by first checking that the locator 130 detects empty space at the desired location. Next, the system 100 moves up and down to find the top and bottom edges of the proposed hole. If this is accomplished and the system 100 finds that the top and bottom edges seem like they are appropriately spaced, then it moves to the center of them and repeats the same check for the left and right edges of the proposed hole. If at any point during this verification step the device determines that the location could not be a hole, then it reports that back to the user interface 156 and leaves the cleaning state.

If the verification step is successful then the system 100 moves to the cleaning stage and moves the cleaning head (e.g. puncher 120) into place. After the head has been placed the system 100 begins to extend the cleaning arm into the chiller until the arm hits a physical limit. If this process times out (i.e., it takes too long) then the system 100 begins attempting to retract the arm and enters a warning state. If the extending process is successful then the system 100 continues by retracting the cleaning arm. If the retracting process is successful (i.e., the hall effect sensor is triggered by the magnet on the cleaning head) then the system 100 reports either success for that cleaning if extending was also successful or a warning if extending was unsuccessful. It also leaves the cleaning state. If the retracting process is unsuccessful then the device returns a critical error to the user interface and enters the error state.

Figure 15:
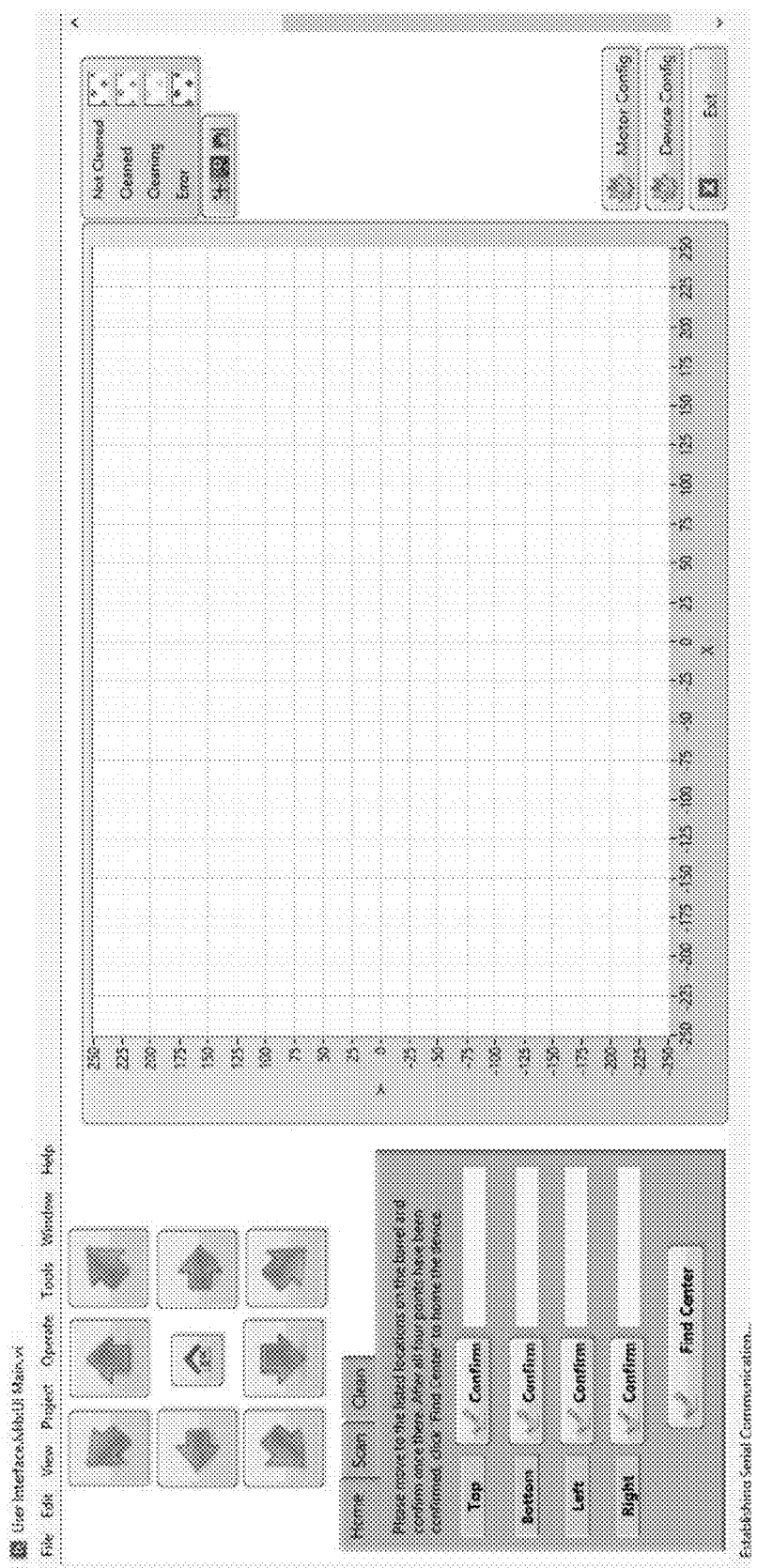
FIG. 15 shows the main control interface for the system such as the system of FIG. 1, which is an example of a display on interface of FIG. 1, in embodiments.

The LabVIEW user interface is where the user controls the system. This interface (e.g. interface 156) may integrate to the embedded system using the serial protocol described above. FIG. 15 shows the main control interface for the system 100, which is an example of a display on interface 156, in embodiments. In the upper is the manual movement control which allows the user to manually adjust the location of the gantry head. In the lower right are the automated controls. On the right is the plot of the scanned points which shows where scanned holes are found, which of those holes has been cleaned, is being cleaned, or had an error occur while cleaning. On the bottom right are the buttons used to reach the configuration menus.

Figure 16:
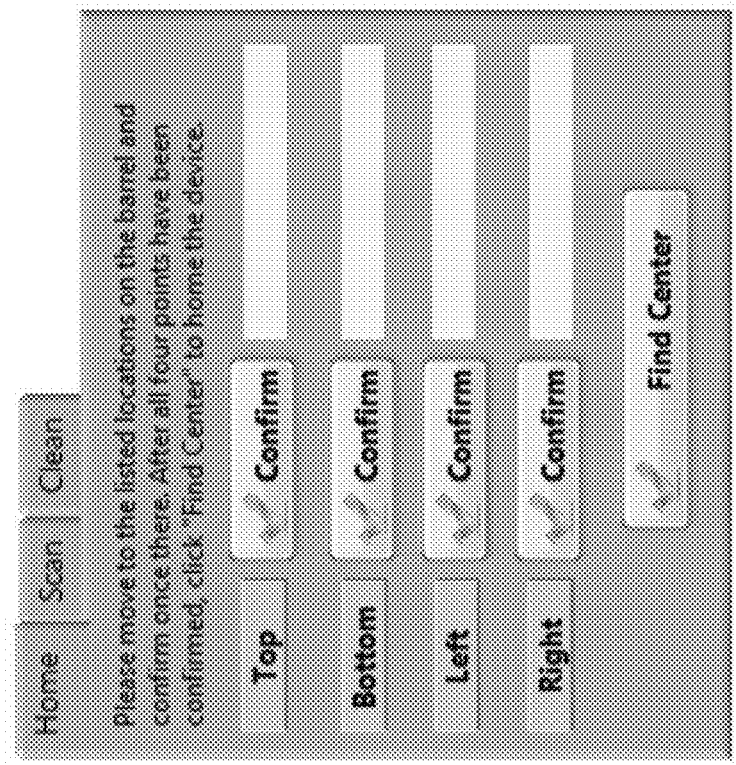
FIG. 16 shows an example control displayed on the interface of the system in FIG. 1, in embodiments.

The first automated control may be the guided homing routine in which the user moves the gantry head to the limits of the chiller barrel. This step allows the process to properly define the software limit on the scanning and cleaning area. For marine end chillers this is important as it prevents the gantry head from contacting the side of the chiller. FIG. 16 shows what this control tab looks like. Note that the user moves the gantry head by interacting with interface 156 to the top, bottom, left, then right of the chiller barrel and then pressed the appropriate confirm button. The find center button then calculated the barrel center and diameter.

Figure 17:
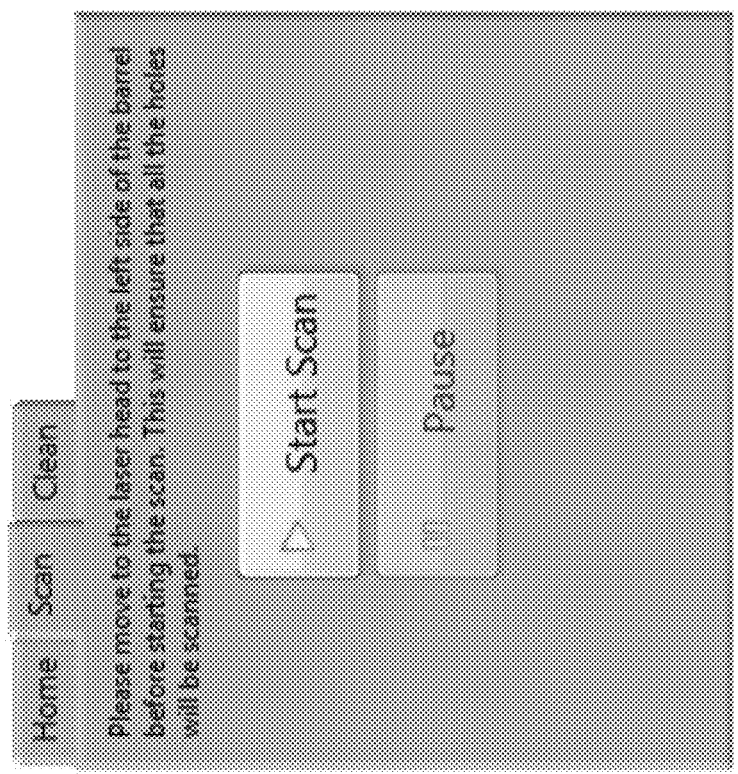
FIG. 17 shows the user interface for the automated scanning process, such as displayed on the interface of FIG. 1, in embodiments.

The next step in the automated cleaning process may be the scanning process. The scanning algorithm begins on the embedded side and then finishes on the user interface side. FIG. 17 shows the user interface for the automated scanning process. Unlike the homing routine, this process may be entirely automated so the user has to begin the scanning process. The embedded system then reports back locations of falling and rising edges which the user interface 156 software uses to calculate the location of holes on the chiller face (i.e. location of open tubes 111). These locations are then plotted on the user interface 156 once the scanning routine is completed. Once the scanning algorithm is complete the user has the opportunity to examine the scanned holes to decide if they match the chiller's tubes 111 closely enough. If the user accepts the scanned tubes, then the process moves on to the cleaning process. Note that a user may still have to start the cleaning process, in embodiments where the cleaning process does not start automatically.

The next step of the cleaning process may be to actually clean the chiller's tubes (e.g. tubes 111). This process is entirely automated in a similar manner to the scanning process. The user has to begin the process using interface

Figures 18, 19:
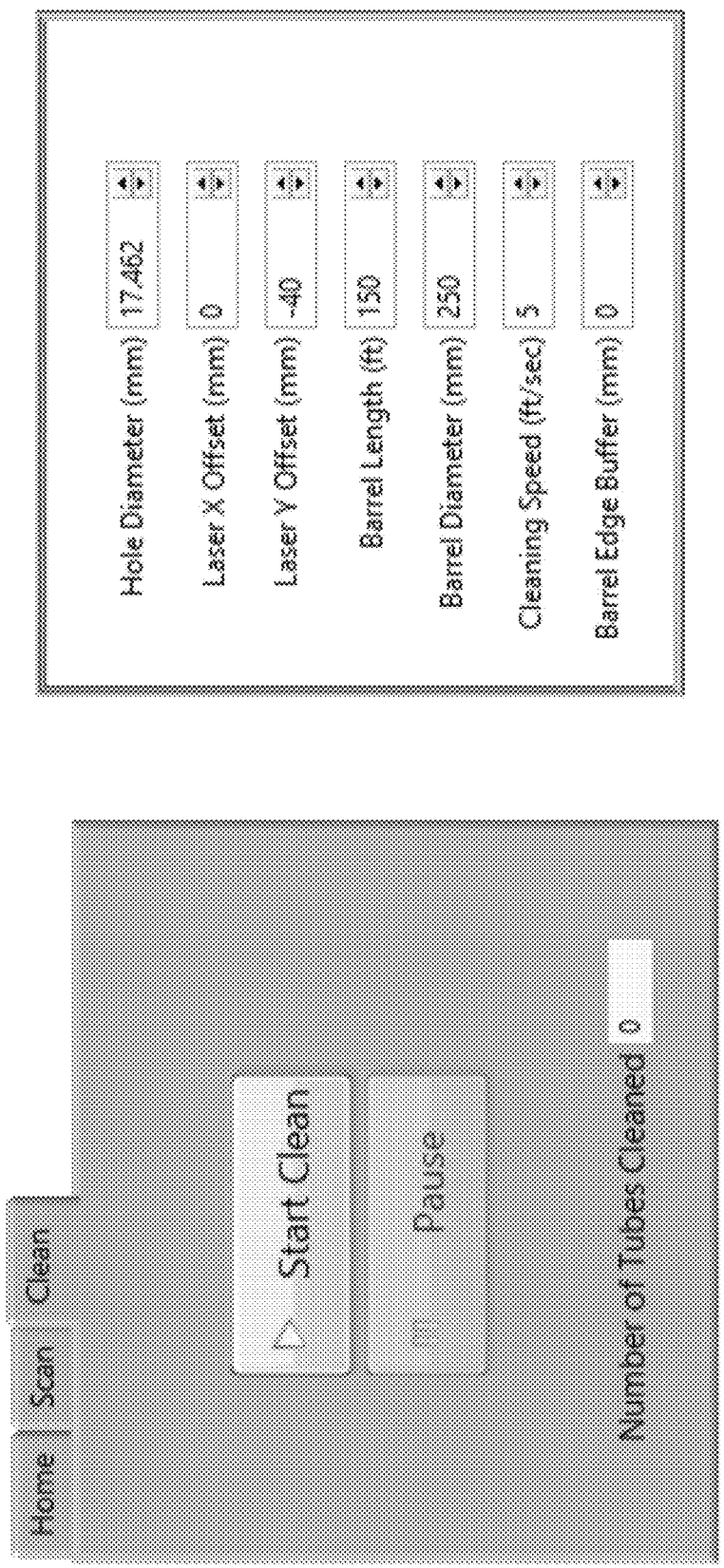
FIG. 18 shows an example of a user interface used in the cleaning process, in embodiments.
FIG. 19 shows the device configuration menu displayed on user interface of FIG. 1, in embodiments.

156, in embodiments. FIG. 18 shows the user interface 156 to the cleaning process, in embodiments. The user interface 156 begins to send the calculated tube 111 centers back to the embedded system to have it clean them using puncher 120. The embedded system accepts one location at a time for cleaning. It first moves to the location, then verifies the tube location before cleaning. The embedded cleaning process then extends the cleaning brush into the tube before retracting it again and reporting back to the user interface on its success or failure.

The user interface 156 may also include the ability to interact with the embedded device's configuration. This allows the user to set parameters like the hole diameter, laser offset, barrel dimensions, and motor speeds. FIG. 19 shows the device configuration menu displayed on user interface 156 of FIG. 1, in embodiments. FIG. 20 shows the motor configuration menu displayed on user interface 156 of FIG. 1, in embodiments.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which might be said to fall therebetween.

What is claimed is:

1. A system for cleaning and inspecting one or more tubes forming a tube bundle, comprising:
   a two-axis stand configured to translate a head parallel to a face plate of the tube bundle;
   a locator mounted to the head and aligned to illuminate and receive reflected light from the face plate of the tube bundle; and
   a puncher mounted to the head and oriented to insert and retract a cleaning tool into and out of one of the tubes.

2. The system of claim 1, further comprising a controller configured to:
   simultaneously translate the head across the face plate and operate the locator to generate scanned data,
   calculate locations of the tubes from the scanned data,
   translate the head to position the puncher in front of one of the tubes according to one of the calculated locations corresponding to said one of the tubes, and
   control the puncher to insert the cleaning tool into said one of the tubes.

3. The system of claim 2, the controller being further configured to:
   activate the cleaning tool to clean said one of the tubes, and
   control the puncher to retract the cleaning tool out of said one of the tubes.

4. The system of claim 2, wherein:
   the locator and the puncher are mounted to the head with a known offset distance therebetween; and
   the controller is further configured to calculate the locations of the tubes based on the known offset distance.

5. The system of claim 2, the controller being further configured to verify a presence of said one of the tubes, after translating the head to position the puncher in front of said one of the tubes, by finding with the locator at least one of a top edge, a bottom edge, a left edge, and a right edge of said one of the tubes.

6. The system of claim 1, further comprising:
   a hose configured to supply water to the puncher for spraying an interior of said one of the tubes; and
   a shield configured to prevent water accumulating on the locator.

7. The system of claim 1, the locator being a laser sensor having a laser configured to illuminate the face plate of the tube bundle with laser light and an optical sensor configured to receive the laser light reflected from the face plate of the tube bundle.

8. The system of claim 1, further comprising an inspection probe installable on the puncher to insert into said one of the tubes and to inspect an interior of said one of the tubes.

9. The system of claim 1, further comprising the cleaning tool.

10. The system of claim 1, the head including a feedback device configured to detect a position of the cleaning tool relative to the face plate of the tube bundle.

11. The system of claim 1, the head including a gimbal that tilts to align the puncher with said one of the tubes.

12. A method that cleans and inspects one or more tubes forming a tube bundle, comprising:
   determining locations of the tubes by simultaneously translating a head of a two-axis stand parallel to a face plate of the tube bundle and operating a locator mounted to the head;
   translating the head to position a puncher mounted to the head in front of one of the tubes according to one of the determined locations corresponding to said one of the tubes; and
   inserting a cleaning tool mounted to the puncher into said one of the tubes.

13. The method of claim 12, wherein determining locations includes determining a hole center and a diameter for each of the tubes.

14. The method of claim 12, further comprising:
   cleaning said one of the tubes by activating the cleaning tool; and
   retracting the cleaning tool out of said one of the tubes after cleaning said one of the tubes.

15. The method of claim 12, further comprising inspecting an interior of said one of the tubes using an inspection probe installed on the puncher.

16. The method of claim 15, wherein inspecting the interior of said one of the tubes includes inspecting said one of the tubes with the inspection probe before and after cleaning said one of the tubes.

17. The method of claim 12, further comprising verifying a presence of said one of the tubes, after translating the head to position the puncher in front of said one of the tubes, by finding with the locator at least one of a top edge, a bottom edge, a left edge, and a right edge of said one of the tubes.

18. The method of claim 12, wherein operating the locator includes:
   illuminating the face plate with laser light; and
   detecting the laser light reflected from the face plate.

\* \* \* \* \*